US012730864B2

(12) United States Patent
Periakaruppan et al.

(10) Patent No.: US 12,730,864 B2
(45) Date of Patent: Sep. 8, 2026

(54) TEXT WATERMARKING USING BITSTREAM ENCODING

(71) Applicant: Zoho Corporation Private Limited, Kanchipuram District (IN)

(72) Inventors: Subathra Periakaruppan, Madurai (IN); Punithavathi Palani, Chennai (IN); Sujatha S Iyer, Chengalpet District (IN); Balachandar S, Chengalpet District (IN); Ramprakash Ramamoorthy, Chengalpet District (IN); Shailesh Kumar Davey, Kanchipuram District (IN); Srisakthi Saravanan, Chennai (IN); Sudheer A. Grandhi, Pleasanton, CA (US)

(73) Assignee: Zoho Corporation Private Limited, Kanchipuram District (IN)

( * ) Notice: Subject to any disclaimer, the term of this patent is extended or adjusted under 35 U.S.C. 154(b) by 0 days.

(21) Appl. No.: 18/628,138

(22) Filed: Apr. 5, 2024

(65) Prior Publication Data

US 2024/0354380 A1 Oct. 24, 2024

Related U.S. Application Data

(60) Provisional application No. 63/471,917, filed on Jun. 8, 2023.

(30) Foreign Application Priority Data

Apr. 19, 2023 (IN) ............................ 202341028573

(51) Int. Cl.
*G06F 21/16* (2013.01)

(52) U.S. Cl.
CPC .................................. *G06F 21/16* (2013.01)

(58) Field of Classification Search
CPC .................. G06F 21/16; G06F 40/166; G06T 2201/0062; G06V 30/18
See application file for complete search history.

(56) References Cited

U.S. PATENT DOCUMENTS 9,330,323 B2 * 5/2016 Simske .................. G06V 10/98
9,811,728 B2 * 11/2017 King ....................... G06F 40/10
(Continued)

FOREIGN PATENT DOCUMENTS

CN 101325642 A 12/2008

OTHER PUBLICATIONS

Ahvanooey, Milad Taleby, et al. "A Comparative Analysis of Information Hiding Techniques for Copyright Protection of Text Documents". Security and Communication Networks, 2018, pp. 1-22 (23 pages).

(Continued)

*Primary Examiner* — Hosuk Song
(74) *Attorney, Agent, or Firm* — Silicon Edge Law Group LLP; Arthur J. Behiel

(57) ABSTRACT

Described are methods and systems that watermark text files in document or image formats using efficient encoding schemes. A unique identifier is encoded into a document by perturbing typographical properties of document elements, such as the lengths and widths of words, lines, or spaces, to encode multiple bits per element. Perturbations to the rendered dimensions of elements create patterns, digital watermarks, that can be decoded to recover the unique identifier, which can in turn be used to identify a user who disclosed or was otherwise responsible for a leaked document.

24 Claims, 9 Drawing Sheets

(56) References Cited

U.S. PATENT DOCUMENTS

| | | | | |
|---|---|---|---|---|
| 9,928,559 | B2 * | 3/2018 | Lahmi | G06T 1/0028 |
| 10,140,263 | B2 * | 11/2018 | Gagné-Langevin | G06F 40/226 |
| 10,275,779 | B2 * | 4/2019 | Papa | G06F 16/13 |
| 10,360,197 | B2 * | 7/2019 | Topness | G06Q 10/10 |
| 10,360,289 | B2 * | 7/2019 | Wang | H03M 7/70 |
| 10,402,869 | B2 * | 9/2019 | Agrawal | G06F 16/95 |
| 11,120,520 | B2 | 9/2021 | Voynov et al. | |
| 11,537,727 | B2 * | 12/2022 | Freundlich | G06F 16/34 |
| 11,847,405 | B1 * | 12/2023 | Anand | G06F 3/1279 |
| 11,979,537 | B1 * | 5/2024 | Gaiser | H04N 1/32331 |
| 12,353,824 | B2 * | 7/2025 | Glase | G06F 16/94 |

OTHER PUBLICATIONS

Alotaibi, Reem, and Lamiaa A Elrefaei. "Improved Capacity Arabic Text Watermarking Methods Based on Open Word Space." Journal of King Saud University—Computer and Information Sciences, Jan. 11, 2017, vol. 30, No. 2, pp. 236-248 (13 pages).

Bianchi, Tiziano. "Secure Watermarking for Multimedia Content Protection: A Review of Its Benefits and Open Issues." IEEE Signal Processing , Feb. 12, 2013, pp. 87-96 (10 pages).

Choo, Hyon-Gon and Kim, Whoi-Yul. "Data-Hiding Capacity Improvement for Text Watermarking Using Space Coding Method." Lecture Notes in Computer Science, vol. 2939, Dec. 1, 2004, pp. 593-599 (7 pages).

Culnane, C., et al. "Improving Mutli-set Formatted Binary Text Watermarking Using Continuous Line Embedding," Second International Conference on Innovative Computing, Informatio and Control, University of Surrey, Japan, 2007, pp. 287-287 (6 pages).

Fang, Wei, et al. "A Survey of Big Data Security and Privacy Preserving." IETE Technical Review, DOI: 10.1080/02564602.2016.1215269, Sep. 17, 2016 (18 pages).

Gupta, Ishu, et al. "Secure Data Storage and Sharing Techniques for Data Protection in Cloud Environments: A Systematic Review, Analysis, and Future Directions." IEEE Access, vol. 10, 2022, pp. 71247-71277 (31 pages).

Kamaruddin, Nurul Shamimi, et al. "A Review of Text Watermarking: Theory, Methods, and Applications." IEEE Access, 2018, pp. 1-1. 10.1109/ACCESS.2018.2796585 (21 pages).

Khadam, Umair, et al. "Advanced Security and Privacy Technique for Digital Text in Smart Grid Communications." Computers and Electrical Engineering, vol. 93, 2021, pp. 1-11. Elsevier Ltd. (11 pages).

Kumar, Ashwani. "A Review on Implementation of Digital Image Watermarking Techniques Using LSB and DWT." Information and Communication Technology for Sustainable Development, Advances in Intelligent Systems and Computing, vol. 933, 2019, pp. 595-602. Springer Ltd. (4 pages).

Nematollahi, M. A., et al. "Chapter 8 Text Watermarking." Digital Watermarking Techniques and Trends, vol. 11, 2017, pp. 121-129, Springer, Singapore (9 pages).

Ou, Chaoli, "Text Watermarking for Text Document Copyright Protection," Computer Science 725 Term paper, Jun. 9, 2003, pp. 1-12 (12 pages).

Qadir, Muhammad, and Ishtiaq Ahmad. "Digital Text Watermarking: Secure Content Delivery and Data Hiding in Digital Documents." IEEE Aerospace and Electronic Systems Magazine, 2006, pp. 18-21 (5 pages).

Rashid, Aaqib. "Digital Watermarking Applications and Techniques: A Brief Review." International Journal of Computer Applications Technology and Research, vol. 5, No. 3, 2016, pp. 147-150 (4 pages).

Saini, Sameeka. "Securing Web Contents through Invisible Text Watermarking for Copyright Protection." International Journal of Engineering Development and Research, vol. 6, Issue 3, 2018, pp. 257-261 (5 pages).

Singh, A.K., et al. "A Survey on Healthcare Data: A Security Perspective." ACM Trans. Multimedia Comput. Commun. Appl., vol. 17, No. 2s, Article 59, 2021, pp. 1-26 (26 pages).

Tayan, Omar, et al. "An Adaptive Zero-Watermarking Approach for Text Documents Protection." Proc. of the Second Intl. Conf. on Advances in Computer and Information Technology, Institute of Research Engineers and Doctors., 2013, pp. 205-208 (5 pages).

Vaezi, Seyed Kamal, "A Review of Copyright Protection Approaches in Electronic Commerce (Watermarking Method) ." International Conference on Electronic Business , 2005, pp. 441-447 (8 pages).

Yang, Huijuan, and Alex Kot, "Text Document Authentication by Integrating Inter Character and Word Spaces Watermarking," IEEE International Conference on Multimedia and Expo, IEEE, 2004, pp. 955-958 (4 pages).

Indian Patent Office, Examination Report under Sections 12 & 13 of the Patents Act, 1970 and the Patents Rules, 2003 (First Statement of Objections), dated Oct. 14, 2025, in Indian Patent Application No. 202341028573 (9 pages total).

Applicant, Response to Indian Patent Office Examination Report dated Oct. 14, 2025, in Indian Patent Application No. 202341028573 (13 pages total).

* cited by examiner

TEXT WATERMARKING USING BITSTREAM ENCODING

TECHNICAL FIELD

The invention relates to provisions for document security.

BACKGROUND

The sharing of electronic files facilitates collaboration but also poses a threat to data integrity. People with file access can "leak" sensitive information, leading to reputational and financial losses. There is therefore a need for methods and systems for identifying leaked documents and the entity or entities responsible for their unauthorized disclosures.

SUMMARY

This patent application details computer-implemented methods for encoding and decoding digital watermarks—identifiers—in digital documents. Text elements in a digital document are formatted according to multi-bit patterns derived from an identifier. These patterns are encoded as renderable typographical properties of text elements, such as width, height, or other dimensions, allowing each text element to carry a portion of the identifier.

Identifiers can be decoded from scanned documents by measuring typographical properties of text elements to extract the encoded identifier and a delimiter that marks the end of the identifier. The decoding process is refined by using the delimiter to select an appropriate decoding scheme, facilitating the accurate retrieval of encoded information. The method accounts for variations in text element properties, such as height and width, and compares these with reference properties from the original document to ensure accurate decoding, even including unchanged typographical properties as part of the decoding process.

BRIEF DESCRIPTION OF THE DRAWINGS

The accompanying drawings are illustrative and not limiting. The left-most digit(s) of a reference number identifies the figure in which the reference number first appears. The same numbers are used throughout the figures to reference like features and components.

DETAILED DESCRIPTION

People and organizations safeguard confidential documents from malicious or inadvertent disclosure, or "leaks." As a protection measure, an original document can be digitally watermarked using an encoding scheme that embeds a unique identifier (unique ID) as patterns of perturbations to the typographical properties of text elements. Typographical properties of text elements are anything that can be modified in a manner that can be optically detected, including the height, width, aspect ratio, area, font, weight, tilt, shade, or color of letters, spaces, words, or lines. For example, a unique ID identifying a document and the document's author can be encoded into the document as a pattern of areal perturbations in the heights and widths of words to be rendered. The unique ID can then be recovered by detecting and decoding the pattern of perturbations.

Document security has limits. Documents are normally shared, which exposes them to intentional and unintentional disclosure. People find out about leaked documents through various channels, including social media, news outlets, and online forums. Leaked documents, once public, are difficult to contain. The best course of action is often to identify the source of the leak and prevent further disclosures. Unfortunately, metadata that might aid in leak detection can be stripped or modified, and does not accompany printed, scanned, or screen-captured documents. Typographical properties are preserved irrespective of metadata, however, so documents encoded with typographically perturbed elements can be decoded absent metadata.

The following discusses various types of text-based documents that can be stored digitally and rendered for display or printing. Documents with editable text are referred to as "digital documents;" the subset of digital documents created via text editors, rather than with the aid of optical-character recognition (OCR), are "native digital documents;" and documents formatted as image files are "scanned documents." Text in scanned documents is not directly searchable or editable.

Figure 1:
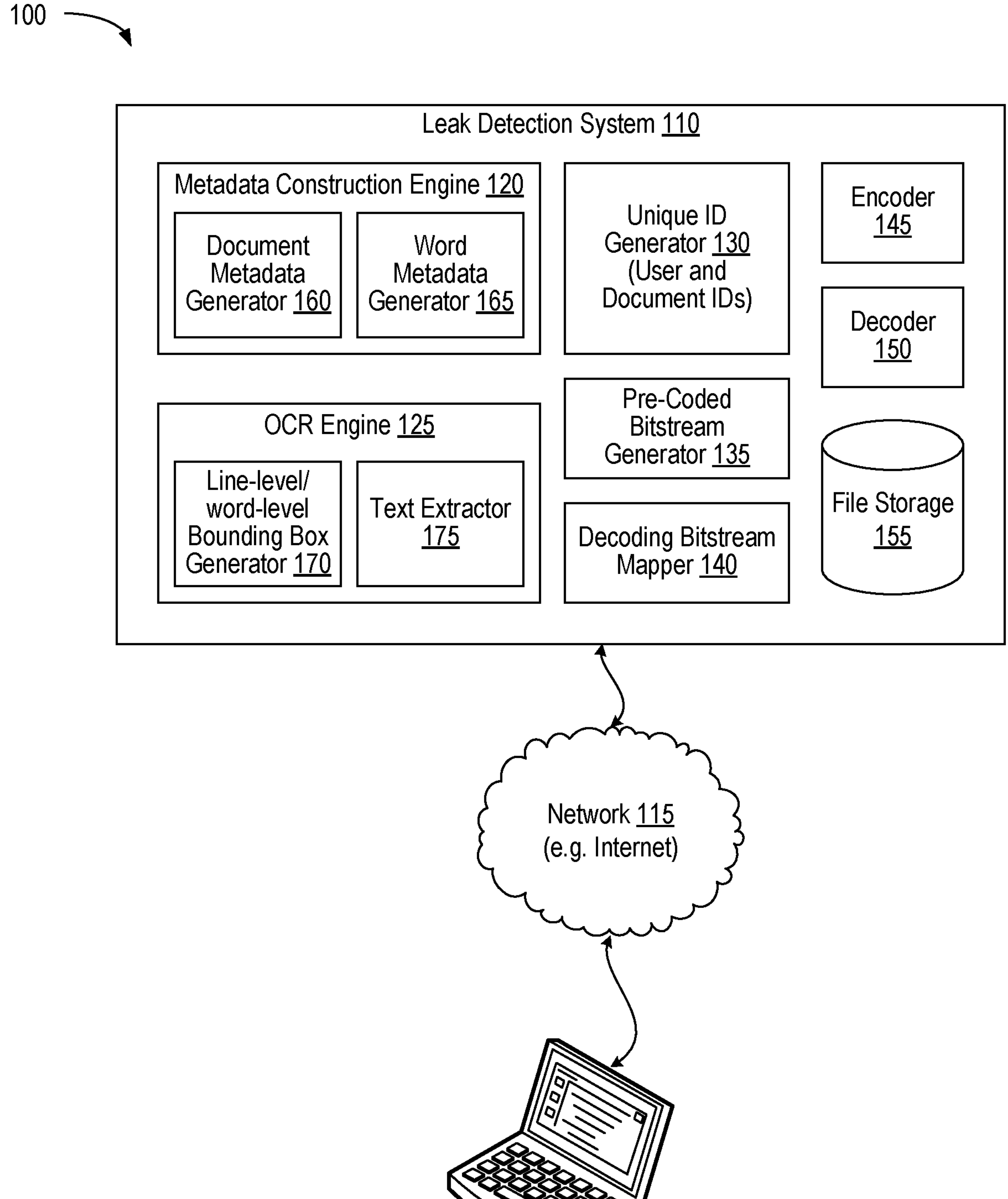
FIG. 1 depicts a leak-detection environment 100 in which a user terminal 105 provides access to a leak-detection system 110 via a network 115.

FIG. 1 depicts a leak-detection environment 100 in which a user terminal 105 provides access to a leak-detection system 110 via a network 115, e.g. the Internet. Leak-detection system 100 includes a metadata construction engine 120, an Optical Character Recognition (OCR) engine 125, a unique identifier (ID) generator 130, a pre-coded bitstream generator 135, a decoding bitstream mapper 140, an encoder 145, a decoder 150, and file storage 155. Metadata construction engine includes a document metadata generator 160 and a word metadata generator 165. OCR engine 125 has a line level/word level bounding box generator 170 and a text extractor 175. Leak-detection system 110 supports four operational phases: unique-ID generation, metadata generation, securing, and investigation.

Unique-ID Generation

Unique ID generator 130 generates unique IDs for both the Users and the Documents, a User ID, and a Document ID, respectively.

Metadata Generation

Metadata construction engine 120 derives document-level metadata and word-level metadata from documents. For scanned documents, OCR Engine 125 extracts the renderable dimensions and text from words of the documents and stores them in file storage 155. Document metadata generator 160 extracts and stores the following document metadata:

1. Number of Pages—The number of pages of a document is stored here.
2. Page Number—This field stores the page number of each page.
3. Line number—Each of the lines in the document is numbered sequentially as they appear in the document. A line-number field holds the line number in the document.
4. Width and Height of Each Line—OCR engine 125 crops the original document line by line, providing a bounding box around each line. The height and width of a line is measured as the height and width of the bounding box.
5. Line ID—Sequential numbers are assigned to the lines as line IDs.
6. Line text—Text extractor 175 extracts the text from each of the lines for storage in this field.
7. Word Metadata—Metadata construction engine 120 uses word metadata generator 165 to provide document metadata generator 160 with information about the words that appear in each of the lines. Word metadata generator 165 extracts and provides the following word metadata:
   a. Page number—This field stores the page number in which a word appears.
   b. Line number—This field stores the line number in which a word appears.
   c. Coordinates <x,y> of the word with respect to page.
   d. Height and Width of Words—The height and width of the bounding box around the word is the measure of the height and width of the corresponding word. Word height and width can be expressed as ratios of word height and width relative to line height and width to account for scaling differences that may occur between original and leaked documents.
   e. Word ID—Words are numbered sequentially, and these numbers are assigned as IDs for the corresponding words.
   f. Word Text—Text from each word extracted using the OCR engine is stored in this field.
   g. Word Space—The measure of the distance between the current word and its succeeding word is stored along with the current word. Spacings can be expresses as ratios of spacings to line length to account for scaling differences between original and leaked documents.

Figure 2:
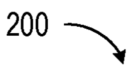
FIG. 2 depicts the flowchart 200 for generating document-level and page-level metadata by Metadata Construction Engine 120 and line-level and word-level renderable dimensions and words by OCR Engine 125.
Figure 2:
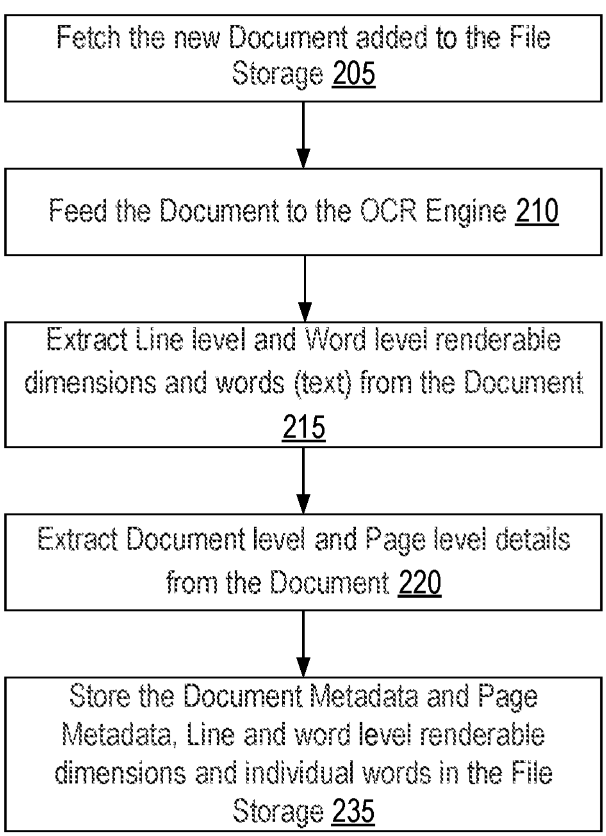

FIG. 2 depicts the flowchart 200 for generating document-level and page-level metadata by Metadata Construction Engine 120 and line-level and word-level renderable dimensions and words by OCR Engine 125. The extracted details are stored in file storage 155. First, in step 205, a document of interest is added to file storage 155. The stored document is fed to OCR Engine 125 (step 210), which extracts line-level and word-level renderable dimensions (step 215). In one embodiment, OCR Engine 125 employs a bounding-box method to extract the rendering dimensions of words. Font sizes specified in native digital documents can be used instead of or in addition to OCR when available. For example, documents in Rich Text Format (RTF) can specify font sizes in values of points, one point being 1/72 of an inch.

Figure 3:
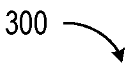
FIG. 3 depicts a bounding-box method 300 used in one embodiment to extract the coordinates of words in a document 305 that bears the sample text "This is a sample text" within a bounding box 315 that is oversized for ease of illustration.
Figure 3:
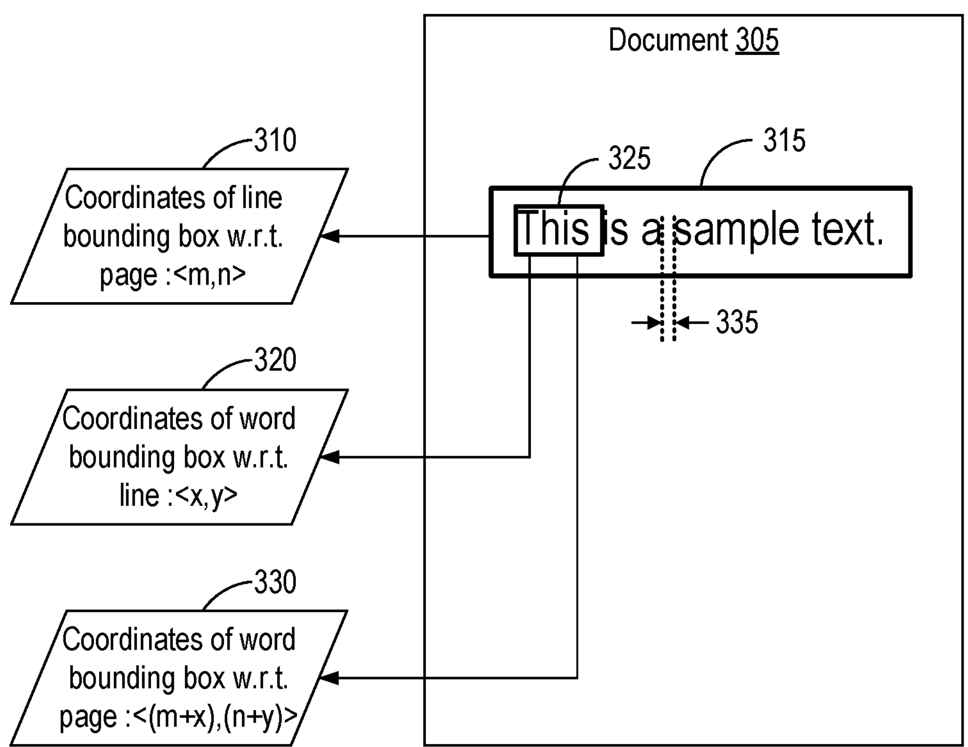

FIG. 3 depicts a bounding-box method 300 used in one embodiment to extract the coordinates of words in a scanned document 305 that bears the sample text "This is a sample text" within a bounding box 315 that is oversized for ease of illustration. The word "This" is likewise within a bounding box 325. Bounding box generator 170 identifies bounding boxes 315 and 320 for each line and word and provides respective Cartesian coordinates 310, <m,n>, and 320 for each. Bounding-box generator 170 also calculates word areas on document 305 with respect to the document boundaries as coordinates 330, <(m+x),(n+y)>, and provides these data to metadata construction engine 120. Normalized text-element height and width are extracted. The ratio between word height and line height is calculated as the normalized height and the ratio between word width and line width is the normalized width. Spaces 335 between words are also extracted. Each of bounding boxes 315 and 320 includes background content and a margin around the text elements. The margins can be made to cover the text in the original document when the area is scaled down.

Document metadata generator 160 extracts document-level and page-level details from document 305 (step 220). The metadata extracted in steps 215 and 220 are stored with document 305 and other metadata in storage 155 (step 235), the other data including a unique document ID generated by ID generator 130.

Securing Phase

With reference to FIG. 1, the securing phase involves pre-coded bitstream generator 135, OCR engine 125, and encoder 145. In this phase, the unique ID is pre-coded for error correction and the resulting bitstream encoded into a text document. The text is selectively reformatted to slightly adjust typographical properties of at least some of the words to encode the bitstream, for example via minor alterations to the heights and widths of words. The end of the pre-coded bitstream is marked by a code delimiter also encoded using a typographical property of a text element or elements.

The text reformatting can be imperceptible, or nearly so, but is nevertheless detectable. One embodiment repetitively embeds bitstreams in a document by encoding each logic one as a slight increase in the height of word, each logic zero as a word of unchanged height, and bitstream delimiters as a slight decrease in the height of a word or words. Multi-word code delimiters can be used to identify whether the length of a pre-coded bitstream is odd or even, and the word spacings of the code delimiter can identify the manner of encoding. Other embodiments encode multiple bits per text element, such as by reformatting words to alter their height, width, or both.

Formatting, in the context of this disclosure, refers to the process of organizing, styling, and sizing text. Formatting can include selecting or changing font size, style, color, spacing, and background. Digital documents can be formatted and reformatted without being presented to a user, in which case "format" refers to renderable aspects of a document rather than rendered ones.

Pre-Coded Bitstream Generator

Pre-coded bitstream Generator 135 generates a unique ID for a document accessed by a specific user. This unique ID is pre-coded using any existing encoding mechanism, such as to include error-correction bits. This pre-coded bitstream generated from the unique ID is used to watermark the documents in a manner that supports the tracking of leaked documents to the leaker. Examples of unique IDs include: a user ID, a user ID concatenated with a document ID, and a user ID concatenated with a document ID and a timestamp of the document when downloaded or viewed.

Figure 4:
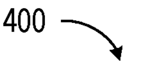
FIG. 4 represents the process of generation of pre-coded bitstreams using example 1(c).
Figure 4:
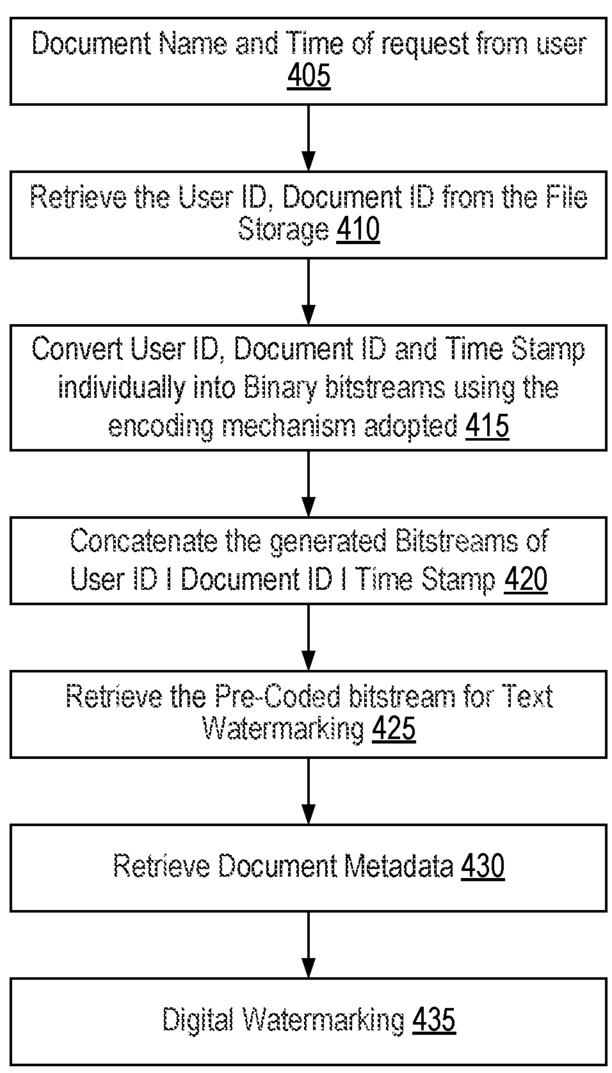

FIG. 4 represents the process of generation of pre-coded bitstreams using example 1(c). The process begins when system 110 receives a document name from a user and records the time of the request as a time stamp (405). System 110 retrieves the document with the associated user and document IDs from file storage 155 (410). Encoder 145 encodes the User ID, document ID, and the time stamp into bitstreams using a suitable encoding mechanism (415), such as a Reed-Solomon algorithm. Pre-coded bitstream generator 135 concatenates the encoded bitstreams (420) to create the unique ID for watermarking the document. In other embodiments, the user ID, document ID, and timestamps are concatenated before pre-coding or are otherwise combined. The metadata corresponding to the requested document ID, including bounding-box coordinates of FIG. 3, are retrieved from file storage 155 (430). The document text is then reformatted—digitally watermarked—by altering the words of the document responsive to the pre-coded unique ID (435).

Encoding 1(a): The pre-coded bitstream is parsed one bit at a time and the document to be watermarked is parsed one word at a time. When the bit encountered in the pre-coded bitstream is "1", the height of the word in the document is increased by e.g. 1%. When the bit encountered is "0", no changes are made to the word. Once all the bits in the pre-coded bitstream are parsed and watermarked in consecutive words of the document, a code delimiter is introduced in the next word of the document. The reformatting for the code delimiter is a decrease in word height by e.g. 1%. The 1% change in the renderable dimensions of the word is difficult for human perception. Alterations in typographical parameters of more or less than 1% can also be used.

This encoding, or encoding scheme, provides three benefits: (1) fewer changes to the document because "0" corresponds to no change; (2) for larger documents, it speeds up encoding because "0" corresponds to no change; and (3) the single-word code delimiter is efficient.

Encoding 1(b): This is like encoding 1(a), but a 0 bit is represented with a height increment and a 1 bit with no change in dimension and the code delimiter is represented by a decrease in word height.

Encoding 1(c): Implementing a variation of encoding 1(a) where a 1 bit is represented with an increase in width of the word by 1% and a 0 bit with no change in dimension. The code delimiter is represented by a decrease in word height by 1%.

Encoding 1(d): This is same as encoding 1(c) where a 0 bit is represented by a width increment and a 1 bit with no change in dimension. The code delimiter is represented by a decrease in word height.

Encoding 1(e): This is same as encoding 1(c), but the 1 bit is represented by a decreased word width by 1%. The code delimiter is represented by a decrease in word height.

Encoding 1(f): This is same as encoding 1(d), but the 0 bit is represented by a decrease in word width. The code delimiter is represented by a decrease in word height. Table 1 summarizes the one-bit encoding schemes of the foregoing encodings.

TABLE 1

One-Bit Encoding in Text Watermarking.

| One-Bit Encoding | Bit Value 1 | Bit Value 0 | code delimiter |
|---|---|---|---|
| 1(a) | Increased word height | No change | Decreased word height |
| 1(b) | No change | Increased word height | Decreased word height |
| 1(c) | Increased word width | No change | Decreased word height |
| 1(d) | No change | Increased word width | Decreased word height |
| 1(e) | Decreased word width | No change | Decreased word height |
| 1(f) | No change | Decreased word width | Decreased word height |

Code Reuse

Some embodiments support code reuse such that multiple users can share the same user ID for document encoding. For example, the user ID "XXXX" can be given to four different users: user A, user B, user C, and user D. These users are distinguished by the encoding used to watermark the document. For example, a document watermarked for user A with encoding 1(a) can be watermarked for user B using the same user ID but a different encoding. The entity in control of the original document maintains a list of users with their corresponding user IDs and the encoding used for them or form them in connection with a specific document.

Code Delimiters to Distinguish the Encodings

Documents are encoded with information that identifies the encoding. The following two approaches can be used.

(1) Changing the number of document elements

A. Decimal representation of embodiment number used.

B. Binary representation of embodiment number used.

(2) Changing the space between the document elements (1) Changing the number of document elements The number of words in the code delimiter can indicate the encoding (watermarking).

(A) Decimal representation of encoding

The one-bit encodings are numbered with decimal representations (e.g. from 1 to 4) and the number of words used to represent code delimiter is chosen to be the encoding number used for watermarking.

(i) One-word code delimiter

Encoding 1(a) is represented using a single word code delimiter throughout the document. At the decoding end, the decoder scans the document for diminished word height and if it finds only one such word at fixed intervals, it is interpreted as a signature for encoding 1(a) and the corresponding decoding, or decoding scheme, is invoked. The decoding can be thought of as the inverse of the encoding, though the relationship between an encoder and a decoder need not be a strict mathematical inverse.

(ii) Two-Word code delimiter

Encoding 1(b) is represented using two consecutive words as a code delimiter throughout the document. At the decoding end, the decoder scans for a two-word code delimiter and invokes the appropriate Decoding.

(iii) Three-Word code delimiter

Decoding 1(c) is represented using three consecutive words as a code delimiter throughout the document.

(iv) Four-Word code delimiter

Four consecutive words are used as code delimiter in Decoding 1(d).

(v) Five-Word code delimiter

Five consecutive words are used as code delimiter in Decoding 1(e)

(vi) Six-Word code delimiter

Six consecutive words are used as code delimiter in Decoding 1(f)

Table 2 depicts the number of words used as code delimiter to represent the type of encoding used for watermarking. This is a variable length code delimiter scheme to distinguish one from the other.

TABLE 2

Variable-Length Code Delimiter to Distinguish Types of One-Bit Encoding.

| Type of One-Bit Encoding Used | Number of words used as code delimiter |
|---|---|
| Encoding 1(a) | 1 |
| Encoding 1(b) | 2 |
| Encoding 1(c) | 3 |
| Encoding 1(d) | 4 |
| Encoding 1(e) | 5 |
| Encoding 1(f) | 6 |

(B) Binary Representation of Encoding Number Used.

The "one" bit encodings, or encoding schemes, are numbered using the binary representation, e.g. 000, 001, 10, 11, 100, and 101. Since there are six different schemes, a minimum of three words are required to select the encoding used for watermarking. To distinguish the no change in word dimension of the pre-coded bitstream and that of the code delimiter, an additional bit is used in the code delimiter. So 1000, 1001, 1010, 1011, 1100 and 1101 are used to represent the code delimiters. The first bit of the code delimiter is chosen to be '1' to indicate the beginning of a code delimiter. During decoding, whenever a word with diminished height is encountered, it is recognized as a code delimiter. The three consecutive words are processed to extract the encoded information to identify the type of one bit encoding used to watermark the document. In this representation, a fixed length code delimiter is chosen unlike the previous representation. The height of the words in the code delimiter is modified by 1% as per Table 3 to represent the encoding used for watermarking. Table 3 represents the Binary representation of the encoding number used for watermarking with the help of the code delimiter. Logic ones are encoded as words with decreased height (DH) and logic zeros as words with no change.

TABLE 3

Binary Representation of Code Delimiters and their Corresponding Dimensional Changes.

| Enc | Delimiter | 1$^{st}$ Word | 2$^{nd}$ Word | 3rd Word | 4$^{th}$ Word |
|---|---|---|---|---|---|
| 1(a) | 1001 | DH | No change | No change | DH |
| 1(b) | 1010 | DH | No change | DH | No change |
| 1(c) | 1011 | DH | No change | DH | DH |
| 1(d) | 1100 | DH | DH | No change | No change |
| 1(e) | 1101 | DH | DH | No change | DH |
| 1(f) | 1110 | DH | DH | DH | No change |

Changing the Space Between Words

The six encoding schemes of Table 3 could be uniquely represented using three binary bits. Four-bit encoding is used so that each encoded delimiter starts with a word of decreased height and is thus distinct from both the increased- and unchanged heights of the words used to embed the unique ID. The remaining three words of the delimiter then select among the six schemes.

Table 4 represents the changes made to the code delimiter to represent different one-bit encoding schemes in one embodiment. The number of words used in the code delimiter is fixed and only the word space is varied to represent the schemes.

TABLE 4

Fixed Length Code Delimiters with Varying Word Space to Represent Schemes of One-Bit Encoding.

| | Delimiter | | Space Before | Space After | Space After |
|---|---|---|---|---|---|
| Enc | 1$^{st}$ Word | 2$^{nd}$ Word | 1$^{st}$ Word | 1$^{st}$ Word | 2nd Word |
| 1(a) | DH | DH | Increased | Increased | Increased |
| 1(b) | DH | DH | Increased | Increased | Decreased |
| 1(c) | DH | DH | Increased | Decreased | Decreased |
| 1(d) | DH | DH | Decreased | Decreased | Decreased |
| 1(e) | DH | DH | Decreased | Decreased | Increased |
| 1(f) | DH | DH | Decreased | Increased | Increased |

Other combinations of space changes can also be used to indicate the type of watermarking encoding. At the decoding end, the watermarked document is scanned for the presence of words with decreased height, marking the delimiter, compared to the original document. Spaces before and between the words of the code delimiter are measured and the logic of Table 4 is used to select the correct decoding scheme.

The advantages of using different encoding schemes that coexist in one text watermarking system are twofold:

1. Security—A diversity of encoding schemes means that unique IDs will be encoded differently in different documents, making it more difficult for an attacker to guess the owner of a document by blind detection.
2. Code Reuse—When the organization expands, the number of employees increases and hence there is a need for longer user IDs. Long user IDs are mapped into longer pre-coded bitstreams, which makes it more challenging to recover full user IDs from cropped and partial documents.

Encoding 2: A Two-Bit Encoding

The following embodiments encode each word in a document with up to two bits of a unique ID.

Encoding 2(a): Table 5 lists dimensional changes for each pair of bits in a pre-coded bitstream used as a digital watermark for securing an original document. Each pair of bits in the bitstream affects the typographical properties of one word in the original document. Pair 01 is encoded in a word as a 1% height increase; pair 10 as a 1% width increase; pair 00 as no change; and pair 11 as a 1% width decrease. In the case of an odd code length for the pre-coded bitstream, the last bit "0" corresponds to no change in word size and the last bit "1" corresponds to a decrease in word width by 1%. The rightmost column lists the number of words in the original document used to encode the two bits in columns A & B. This is to showcase that apart from the code delimiter(s), two bits of the Unique identifier bit sequence are encoded in a single word of the document thus increasing the density of encoding in the watermarked document.

A code delimiter is watermarked by a decrease in word height by 1%. For an even length code of a pre-coded bitstream, an even number of words is used as a code delimiter (in Table 5, two words are used) and in the case of an odd-length code, an odd number of words is used as a code delimiter (in Table 5, one word is used).

TABLE 5

Rendering Dimensional Changes for Encoding 2(a).

| Bit(s) (A) | Code Delimiter (CD represents one word) (B) | Watermarking Dimensional Change for Bit Pair (C) | Watermarking Dimensional Change for Code Delimiter (D) | Number of words watermarked in the original document to encode the bits in Columns A & B (E) |
|---|---|---|---|---|
| 01 | — | Increased Height | — | 1 |
| 10 | — | Increased Width | — | 1 |
| 00 | — | No Change | — | 1 |
| 11 | — | Decreased Width | — | 1 |
| 01 | CD CD | | Decreased Height Decreased Height | 3 (1 word for bits and 2 words for Code Delimiter) |
| 10 | CD CD | | Decreased Height Decreased Height | 3 |
| 00 | CD CD | | Decreased Height Decreased Height | 3 |
| 11 | CD CD | | Decreased Height Decreased Height | 3 |
| 0 | CD | | Decreased Height | 2 (1 word for bit and 1 word for Code Delimiter) |
| 1 | CD | | Decreased Height | 2 |

This encoding scheme provides four benefits: (1) denser watermarking helps in retrieving the unique ID even from a smaller portion of the leaked document, (2) fewer changes to the document because "00" and "last bit 0" correspond to no change, (3) for a large document it speeds up encoding because "00" and "last bit 0" correspond to no change, and (4) reduced overhead for code delimiters because only one or two words are used.

Various encodings of 2(a) can be realized by changing the size of different dimensions of the text document to produce encodings 2(b) to 2(h). Some embodiments of two-bit encoding schemes are shown in Table 6.

TABLE 6

Two-Bit Encodings.

| Bits | Rendering Dimensional Changes to a Single Word to Distinguish between Various Schemes | | | | | | | |
|---|---|---|---|---|---|---|---|---|
| | 2(a) | 2(b) | 2(c) | 2(d) | 2(e) | 2(f) | 2(g) | 2(h) |
| 01 | Increased Height | Increased Width | No Change | Decreased Width | Increased Height | Increased Height | Increased Height | Increased Height |
| 10 | Increased Width | Increased Height | Increased Width | Increased Width | No Change | Increased Width | Decreased Width | Increased Width |
| 00 | No Change | No Change | Increased Height | No Change | Increased Width | Decreased Width | No Change | Decreased Width |
| 11 | Decreased Width | Decreased Width | Decreased Width | Increased Height | Decreased Width | No Change | Increased Width | No Change |
| 0 | No Change | No Change | Increased Height | No Change | Increased Width | Decreased Width | No Change | Decreased Width |
| 1 | Decreased Width | Decreased Width | Decreased Width | Increased Height | Decreased Width | No Change | Increased Width | No Change |
| code delimiter | Decreased Height | | | | | | | |

Two-bit encodings support code reusability. A single user ID can be used by eight different users in the example of Table 6. Various combinations of changes in the rendering dimensions can lead to yet different usable encoding schemes, and thus further support code reusability. The use of code delimiters to distinguish between the schemes of two-bit encoding and between odd and even bitstreams is dealt with in the subsequent paragraphs. The number of encodings can be more or fewer and encoding can be extended to more than two bits per element.

Identification of the Type of Encoding Scheme Used

The eight encoding schemes of Table 5 can be distinguished using three bits embedded in spaces adjacent the words of the code delimiter.

Indicator for Odd/Even Length Pre-Coded Bitstream

When encoding an odd number of bits using two-bit encoding, the last bit will be unpaired. Code delimiters can identify embedded bitstreams as odd or even so the bitstream can be interpreted correctly. For example, the number of words in a code delimiter can be odd or even to identify the encoded bitstream as odd or even. When extracting an encoded identifier, the code delimiter can be decoded to extract a parameter expressing a property of the identifier, such as whether the identifier has an odd or even number of bits. The identifier can then be decoded in view of that parameter. Other parameters can also be encoded in code delimiters.

Determining the Code Delimiter for a Pre-Coded Bitstream

Code delimiters can be encoded to indicate both the decoding scheme for the watermark bitstream and whether the bitstream has an odd or even number of bits.

1. Indicator for Type of Encoding Scheme

Let the number of encoding schemes in use=N and let the B be the number of bits to represent N in binary, then, 2^B=N. The type of encoding scheme can be encoded in the spaces adjacent words in the code delimiter, B spaces to encode the N encoding schemes. The number of words in the code delimiter is therefore (B−1), the decrement accounting for the fact that strings of words have both leading and trailing spaces, and thus one space more than the number of words.

2. Indicator for Length (Odd/Even) of Pre-Coded Bitstream

If (B−1) is odd, then (B−1) words are used as code delimiter to indicate an odd length pre-coded bitstream and B words are used to represent the even length of pre-coded bitstream and vice versa. To realize the outcome of the above proposal in action, Table 5 is taken into consideration.

Eight encoding schemes can be used for encoding (N=8). Three word spaces are used to select among the eight encoding schemes (B=3) so the code delimiter is two words (B−1=2). An extra word in the code delimiter is used in this scheme to distinguish between odd and even pre-coded bitstreams. code delimiters of two or three words respectively represent even- and odd-length bitstreams. Table 7 lists the number of words in a code delimiter and the word space for the schemes of Table 5.

TABLE 7

Word Space in Code Delimiter Words to Distinguish Two-Bit Encoding Schemes and the Length of the Pre-Coded Bitstream.

| Encoding Scheme | Words in Delimiter: Odd bitstream | Words in Delimiter: Even bitstream | Word Space in the Delimiter: Before First Word | Word Space in the Delimiter: After First Word | Word Space in the Delimiter: After Second Word |
|---|---|---|---|---|---|
| 2(a) | 3 | 2 | Decreased | Decreased | Decreased |
| 2(b) | 3 | 2 | Decreased | Decreased | Increased |
| 2(c) | 3 | 2 | Decreased | Increased | Decreased |
| 2(d) | 3 | 2 | Increased | Decreased | Decreased |
| 2(e) | 3 | 2 | Decreased | Increased | Increased |
| 2(f) | 3 | 2 | Increased | Increased | Decreased |
| 2(g) | 3 | 2 | Increased | Decreased | Increased |
| 2(h) | 3 | 2 | Increased | Increased | Increased |

Code Reuse

Like the "one-bit" encodings, the "two-bits" encodings also support code reusability. Code reuse for the "two bits encoding" schemes is depicted in Table 8 in which dimensional changes are done by increasing or decreasing the word space by 1%. Code reusability is exhibited in the last two columns. Column [3] lists different user IDs who share the same pre-codes as shown in column [2]. The pre-code 111 (in turn the user ID) can be shared among the users A to H. The pre-code 1011 is shared among I, J and K. Pre-code 100 is shared among L, M and N. Pre-code 11000 is shared between O and P.

TABLE 8

Code Reuse with Two-Bit Encodings.

| Scheme Type [1] | Pre-coded bitstream [2] | User ID [3] |
|---|---|---|
| 2(a) | 111 | A |
| | 1011 | I |
| 2(b) | 111 | B |
| | 1011 | J |
| 2(c) | 111 | C |
| | 1011 | K |
| 2(d) | 111 | D |
| | 100 | L |
| 2(e) | 111 | E |
| | 100 | M |
| 2(f) | 111 | F |
| | 100 | N |
| 2(g) | 111 | G |
| | 11000 | O |
| 2(h) | 111 | H |
| | 11000 | P |

Let a scenario under which the User ID 'E' whose pre-coded bit sequence '111' is to be watermarked in the text document. The following processing is done:

Encoding

Table 7 is taken into reference to explain the encoding process. On the encoding side, since the pre-coded bitstream is of odd length, the code delimiter uses 3 words whose width remains unchanged, but height is decreased by 1%. Now that user ID 'E' belongs to the group of user IDs that are to be encoded using the Encoding 2(e). The space before the first word in the code delimiter remains unchanged while that of the space after the first and second words are increased by 1%.

Decoding

A leaked document is decoded with reference to an original version of the leaked document. In the examples of FIGS. 1 and 2, the original document is in file storage 155 with relevant metadata, including measures of reference typographical properties (e.g. line- and word-level renderable dimensions) for comparison with changed typographical properties of a leaked version of the document.

The decoding process starts with the analysis of the code delimiter with respect to Table 7. The document to be analyzed is scanned for the words representing the code delimiter (diminished height in comparison with the original document). Then the number of words representing the code delimiter is also determined. An odd number of words in the code delimiter indicates that the number of bits in the pre-coded bitstream is of odd length. The spaces adjacent the words of the code delimiter are examined for variation in comparison with the original document. The measured variations are mapped with Table 7 to identify the encoding scheme used in watermarking the document. Once the type of encoding is identified, the appropriate decoding scheme is invoked to extract the pre-coded bitstream encoded in the watermarked document.

Table 8 shows user IDs associated with pre-coded bitstreams used for document watermarking. User ID "E" is encoded using Encoding 2(e) to produce pre-coded bitstream 111 for watermarking. Bitstream 111 is also assigned to users A, B, C, D, F, G, and H, and is thus insufficient to identify user "E". The correct decoding scheme is also required. In the example of Table 8, applying the inverse of Encoding 2(e) to extracted watermark bitstream 111 gives user ID "E". Code delimiters are thus encoded to identify the scheme for decoding the watermark bitstream.

User ID "E" is expressed as pre-coded bitstream 111, which has an odd number of bits. Following the example of Table 7, a three-word code delimiter is used to note the odd pre-coded bitstream. The word immediately preceding the delimiter is thus decoded as the final bit of the pre-coded bitstream rather than the final pair of bits. The other word or words preceding the delimiter are decoded as bit pairs. The overall pre-coded bitstream, 111 in this example, is extracted from the areal perturbations of the words preceding the delimiter. From Table 8, bitstream 111 corresponds to users A, B, C, D, E, F, G, and H. In this context, area perturbations change area, such as by modifying the areal properties of length, width, or both.

The spaces adjacent the words of the code delimiter are examined to identify the scheme used to pre-code the bitstream for watermarking, and thus the inverse scheme for decoding the user ID from extracted bitstream 111. Here, the space between the words in the code delimiter has a variation in word spaces as "Decreased, increased, increased," a pattern that maps to Encoding 2(e) in Table 7. The extracted pre-code '111' is thus mapped to User ID 'E'.

Security Through Encoding Bits Schemes

Table 8 shows user IDs bound to a specific encoding bits. The user ID for any document will have the same encoding scheme. An alternate option would be to associate every document with a specific bit encoding.

Table 9 depicts document ID mapping to different encoding bits schemes. Any user accessing a document will have his/her pre-coded bitstream encoded using the scheme associated with that document. So a single user's pre-coded bitstream will be encoded using different schemes depending on the document he/she is accessing.

TABLE 9

Mapping of Documents with Different Schemes and their Corresponding Word Space in the Code Delimiter

| Encoding Type | Document IDs Associated with the Scheme |
| --- | --- |
| 2(a) | DID1, DID8, DID12 |
| 2(b) | DID21, DID83, DID112, DID234 |
| 2(c) | DID72, DID81, DID12 |
| 2(d) | DID441, DID84 |
| 2(e) | DID67, DID87, DID182, DID990 |
| 2(f) | DID98, DID998, DID52 |
| 2(g) | DID66, DID8, DID222, D78 |
| 2(h) | DID906, DID44, DID555 |

The change in dimensions to represent the schemes using the word space in Table 9 is done by an increase or a decrease in space by 1%. The above mapping secures the system against fabrication attack. Here an attacker who has access to any one of the documents watermarked by a user can extract the unique ID encoded into the document even in the absence of the original document. This is done by analyzing the variation in the dimensions of the words in the watermarked document. Now, the attacker can try to use the same pattern to watermark a sensitive document in the organization and disclose it to unauthorized people inside or outside the organization. The newly created document by the attacker is the fabricated document which can either be done purposely to frame an innocent user as a leaker of the document or to hide the identity of the attacker who wants to disclose the document.

The security provided through the mapping as shown in Table 9 is given here: As per the mapping given in Table 9, a user A accessing document with ID DID98 will use Encoding 2(f) for encoding his/her pre-coded bitstream of the unique ID. But if the same user accesses a document with ID DID81, Encoding 2(c) is used for encoding. So even if an attacker performs a cipher-text only attack and retrieves the pattern of encoding from the document DID98, the attacker will not be able to fabricate and leak another document as accessed by User A using Encoding 2(f). This is because the scheme assigned to User A to encode the document may not be 2(f). If the Document IDs and Scheme mappings are kept secret, fabrication attacks can be evaded.

Text watermarking systems that support alternative encoding schemes provide document security according to any of the following numbered clauses: 1. A method for security against fabrication attack for the users, the method comprising: use of all varieties of encoding to coexist in the watermarking system. 1(a). A method of clause 1, wherein different sets of documents are associated with different types of encoding; the association table is maintained confidential. 1(b). A method of clause 1(a), wherein the user identifier of a user accessing a document is encoded with the encoding type associated with the document. 1(c). A method of clause 1(a), wherein blind detection of a watermarked document does not reveal the encoding type associated with other documents. 1(d). A method of clause 1(b), wherein the extracted pattern of encoding from a watermarked document may not match with the encoding type associated with other documents; fabrication attack mitigated.

Variations in Code Delimiters

Table 6 shows only eight different schemes. However, many such schemes can be used for watermarking. If the number of schemes used increases, then the number of words used to represent the code delimiter can also increase. Overly long code delimiters can be avoided by using more than one type of delimiter. For example, two types of delimiters can be used: (1) a short delimiter e.g. just one word length, carrying no information (used more frequently); and (2) a long delimiter carrying full information (used less frequently). The short delimiter is used to mark the beginning and end of every single pre-coded bitstream being encoded while the long delimiter indicates the type of scheme used for the encoding for the pre-coded bit. The long delimiter can be used at the beginning of a page or a paragraph while the short delimiter can be used at the beginning of every pre-coded bitstream.

Alternatively, the delimiter can be split into parts and included in after consecutive code words. The first (prefix) part of the code delimiter should be a short delimiter carrying no information to indicate the beginning of the code delimiter and the second (suffix) part indicating the type of scheme used in encoding. Types of code delimiters Used in the Proposed System are given in the following Table 10:

TABLE 10

Types of Code Delimiters Proposed.

| S. No | Type of code delimiter | Depiction/Description |
| --- | --- | --- |
| 1 | Variable Length Fixed Word Space | Table 1 & Table 3 |
| 2 | Fixed Length Fixed Word Space | Table 2 |
| 3 | Fixed Length Variable Word Space | Table 4 & Table 9 |
| 4 | Variable Length Variable Word Space | Table 7 |
| 5 | Short and Long Delimiters | Two different code delimiters used at different locations. |
| 6 | Single code delimiter with prefix and suffix parts | Single code delimiter with Two different parts each representing a different information. |

User ID code reuse is facilitated with code delimiters, and the methods according to any of the following numbered clauses: 2. A method of for code reuse of the user identifier, the method comprising: reuse of the same user identifier for multiple users by using variations in encoding type with the code delimiter containing information for decoding. 2(a). A method of clause 2, wherein shorter codes of the user identifier are reused more than the longer codes. 2(b). A method of clause 2(a), wherein the user identifier is extracted from a cropped document of smaller size. 2(c). A method of clause 2, wherein multiple schemes of encoding can coexist in the same watermarking system which can be distinguished by the code delimiter. 2(d). A method of clause 2, wherein generalized rules are formulated to create a code delimiter for a given unique ID. 3. A method for use of variations of code delimiters, the method comprising: variable length code delimiter with fixed word space/fixed length code delimiter with variable word space/fixed length code delimiter with variable word space/variable length code delimiter with variable word space/short and long delimiters/single code delimiter with prefix and suffix parts.

Figure 5:
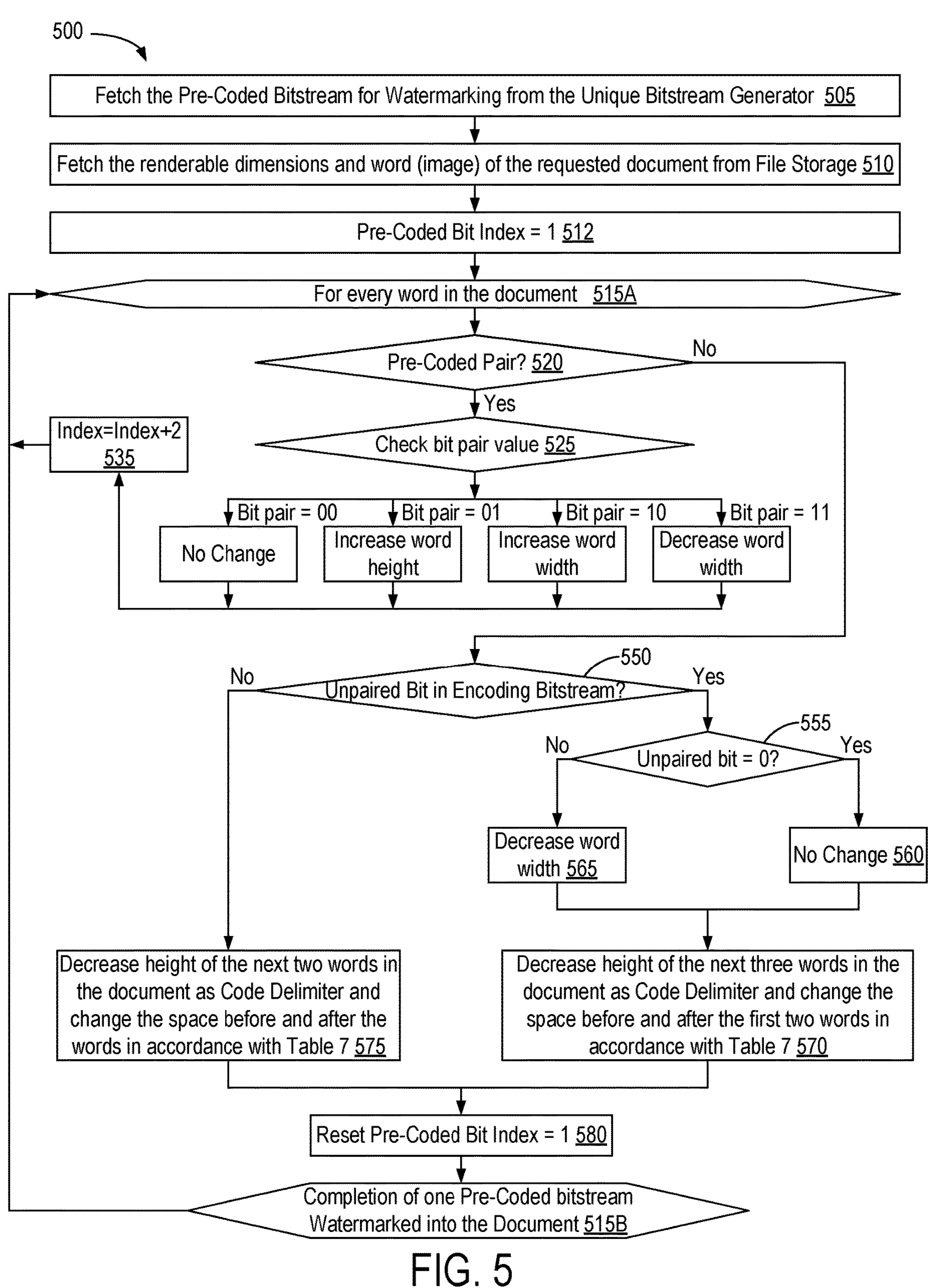
FIG. 5 depicts a two-bit watermark encoding process 500 in accordance with one encoding scheme.

FIG. 5 depicts a two-bit watermark encoding process 500 in accordance with Encoding 2(a). A pre-coded bitstream is made available for a user requesting the document (505). Different users requesting the same document will have unique watermarking. Watermarking can identify more than one user or can identify a stored distribution list. This makes it feasible to trace back the User ID of the leaker from the leaked Document. Next, the original document with metadata, including the renderable dimensions of words and lines, is fetched from file storage (510). A bit index to the first bit of the pre-coded bitstream is set to one (512). Each word in the document is then parsed and sized, as needed, to encode the bitstream (for-loop 515A/B).

Each word in the document is matched to the pair the pre-coded bits at the bit index until the pre-coded bitstream runs out of bit pairs. Per decision 520, if a pair of pre-coded bits is available then the process passes to decision 525. The pair is encoded in the corresponding word as follows: bit pair 01 is encoded as an increase in word height; bit pairs 10 and 11 are encoded as a respective increase or decrease in word width; and bit pair 00 is encoded as an unchanged word. For each word, the index of the next pair of pre-coded bits is advanced to the next pair (535) and the process returns to for-loop 515A to consider the next word.

The index to the next pair (535) produces three possible outcomes. There may be a next pair of bits for the process of step 520 to encode, in which case the process of decision 525 repeats to encode the next pair in the corresponding next word. There may be no further pairs, however, either because the bitstream is fully encoded or because the bitstream includes an odd number of bits and thus an unpaired last bit. If there are no further pairs, decision 520 transitions to decision 550. If there is no unpaired bit, decision 550 transitions to step 575 in which the heights of the next two words of the document are decreased and their spacings changed to encode a code delimiter indicative of an even bitstream. The bit index is reset to one (580) and the process restarts for-loop 515A/B to repeat the bitstream encoding for the next word until the document runs out of words.

In the case of an unpaired last bit, decision 550 transitions to decision 555. The process either encodes no change to the current word (560) if the unpaired bit is zero or decreases the word width (565) if the unpaired bit is one. The heights of the next three words of the document are then decreased and their spacings changed to encode a code delimiter indicative of an odd bitstream (570). The bit index is reset to one (580) and the process restarts for-loop 515A/B to repeat the bitstream encoding until the document runs out of words.

The steps in the encoding process of watermarking a document can follow any of the following numbered clauses: 3. A method for encoding a user identification in a document, the method comprising: combining changes to both document elements and spaces but each of them being used for different purposes. Clause 3(a). A method of clause 3, wherein the user identification is encoded in the elements of the document. Clause 3(b). A method of clause 3(a), wherein the encoding is done in the renderable dimensions such as the height and width of the elements in the document. Clause 3(c). A method of clause 3, wherein the user is identified by a unique ID which is a combinations of user ID, Document ID, and Time of access of the document by the user. Clause 3(d). A method of clause 3(c), wherein error correction codes are incorporated to extract the identification of the user from distorted documents. Clause 3(e). A method of clause 3, wherein a code delimiter is used as a separator between two consecutive watermarking. Clause 3(f). A method of clause 3(e), wherein the identifier for the type of encoding is indicated in the space between the elements of the code delimiter. Clause 3(g). A method of clause 3(e), wherein different types of code delimiters are used to distinguish one type of encoding from the other. Clause 3(h). A method of clause 3, wherein the last word in the multibit encoding (e.g. "two-bits" encoding) represents different number of bits depending on the length of the pre-coded bitstream.

The encoding process involves changes to the rendering dimensions of the document and can follow methods according to any of the following numbered clauses: clause 4. A method for encoding the unique ID, the method comprising: any one of the bits (e.g. '0' bit) or bit pair (e.g. "00" bits) corresponding to no change; with the other bit (e.g. '1' bit) or bit pairs (e.g. "01", "10" & "11) and code delimiters represented with changes in the rendering dimensions. Clause 4(a). A method of clause 4, wherein the unique ID and code delimiters are encoded in the rendering dimensions (e.g. height and width) of the elements of the document. Clause 4(b). A method of clause 4, wherein the binary representation of the scheme in the code delimiter, is encoded with a no change to one of the bits (e.g. '0' bit); with the other bit (e.g. '1' bit) represented with changes in the space between the elements representing the code delimiter.

The encoding process provides dense watermarking in the document and can follow the methods according to any of the following numbered clauses: clause 5. A method for encoding multiple bits, the method comprising: encoding two or more bits per rendering element of the document. Clause 5(a). A method of clause 5, wherein multiple bits are mapped to a single change in the renderable dimension of the elements of the document. Clause 5(b). A method of clause 5, wherein encoding multiple bits (e.g. '0' or '00' or '000') of the unique ID corresponding with no change in the rendering dimensions of the elements.

The encoding process also involves a minimum number of dimensional changes to a single rendering element and can follow method according to the following numbered clause: clause 6. A method for minimal number of dimensional changes to the rendering elements, the method comprising: encoding two or more bits in a single element of the document in "multiple bits" encoding (e.g. 00/01/10/11); changes are made to only one of the dimensions of a rendering element (e.g. height/width); representing a bit or a set of bits (e.g. '0' or '00') with no change in any of the dimensions of the rendering elements.

Investigation Phase

The investigation phase for a scanned, leaked document involves OCR engine 125, metadata from the original document, and the decoding bitstream mapper 140. System 110 first determines whether the leaked document is a whole document or a partial document. To perform this, OCR engine 125 extracts the words and dimensions of the words from the leaked document. This process can also correct for distortion and normalize dimensions to account for scaling issues. These data are then compared, word for word, with the metadata of the original document in file storage 155. The normalized areal properties of each word in the leaked document are compared with the typographical properties of the corresponding word in the original document to recover the encoded bitstreams and code delimiters.

Figure 6:
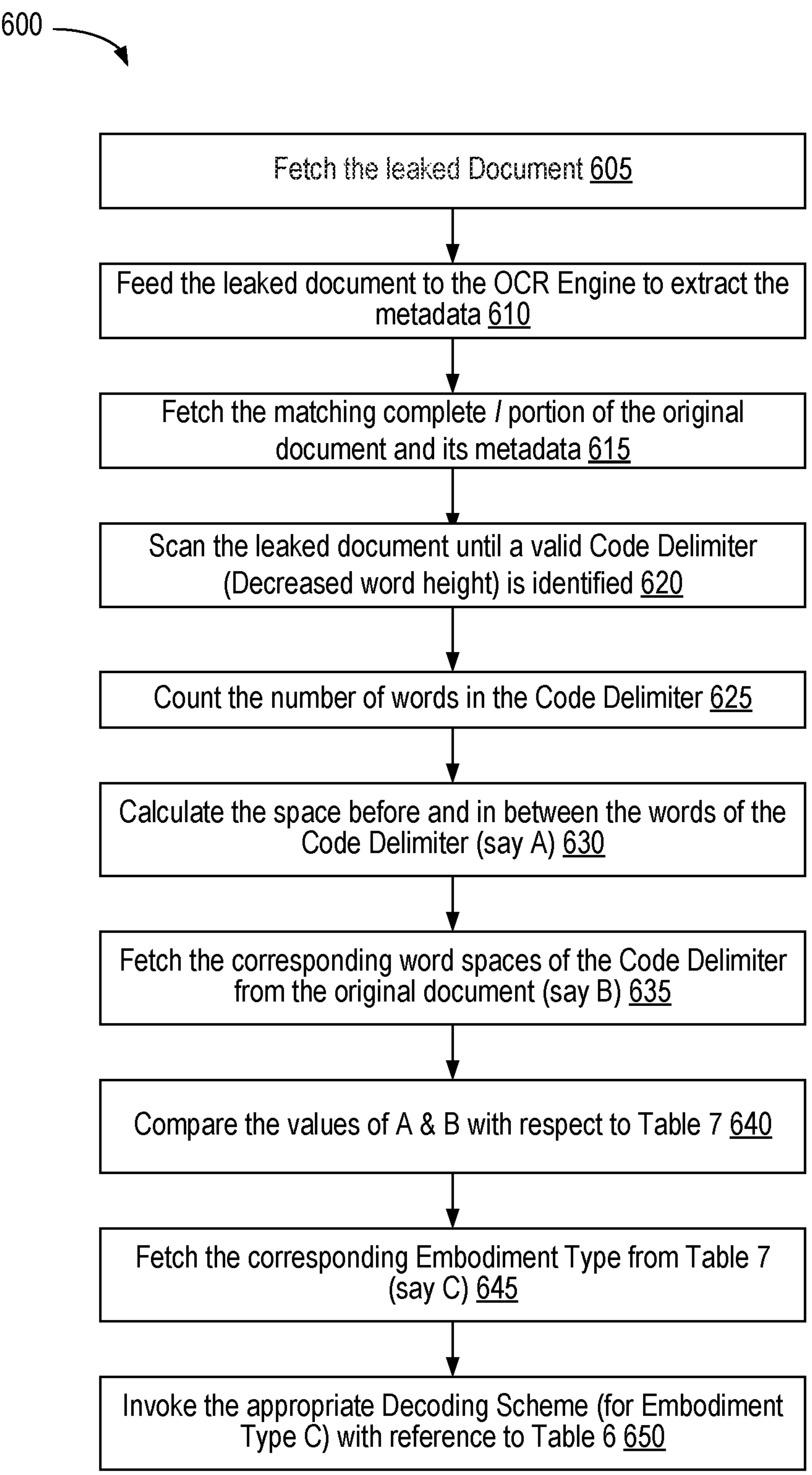
FIG. 6 is a flowchart 600 depicting a decoding process in accordance with one decoding scheme.

FIG. 6 is a flowchart 600 depicting a decoding process in accordance with one decoding scheme. The leaked document is fetched (605) and fed into an OCR engine to extract document metadata, including typographical properties used for bitstream encoding (610). The original document is likewise fetched (615) so that it or a portion that matches the leaked document can be used as a reference for decoding the leaked document.

The leaked document is scanned to identify a code delimiter (620), e.g. a word or sequence of words with decreased word heights. The number of words in the code delimiter is counted (625) and the spaces, if any, before and between the words of the code delimiter are calculated (630). The corresponding spaces are fetched from the metadata in the original document (635) and compared with the normalized spaces from the leaked document (640). The results of the comparison are then used to fetch a decoding scheme (645), which is then applied to the leaked document to recover the encoded bitstream (650).

Invoking the Decoding Scheme and Identifying the User/Leaker of the Document

The number of words used in the code delimiter and the word spaces are mapped with Table 7 and the dimensional changes for the scheme are retrieved from Table 6. These mapping tables select the decoding scheme to extract the watermarked pre-coded bitstream from the leaked document and identify the corresponding user.

The steps in the decoding process to extract the unique ID of the watermarked documents can be carried out using the methods of the following numbered clauses: clause 7. A method for decoding a user identifier from the document, the method comprising: scanning the document to extract the code delimiter; mapping the encoded information in the code delimiter to identify the encoding type used; invoking the appropriate decoding scheme for the encoding. Clause 7(a). A method of clause 7, wherein the user identity is associated with a unique ID, the method comprising: decoding the unique ID and mapping it back to the user identity using the Decoding Bitstream Mapper. Clause 7(b). A method of clause 7, wherein the type of encoding is decoded from the space between the elements representing the code delimiter. Clause 7(c). A method of clause 7, wherein information on the length (odd/even) of the pre-coded bitstream encoded in the document is extracted from the number of elements used as code delimiter. Clause 7(d). A method of clause 7(c), wherein different decoding methods are invoked for extracting the bits from the last word of the pre-coded bitstream: odd length pre-coded bitstream is mapped to a single bit; even length pre-coded bitstream is mapped to a pair of bits.

Figure 7A:
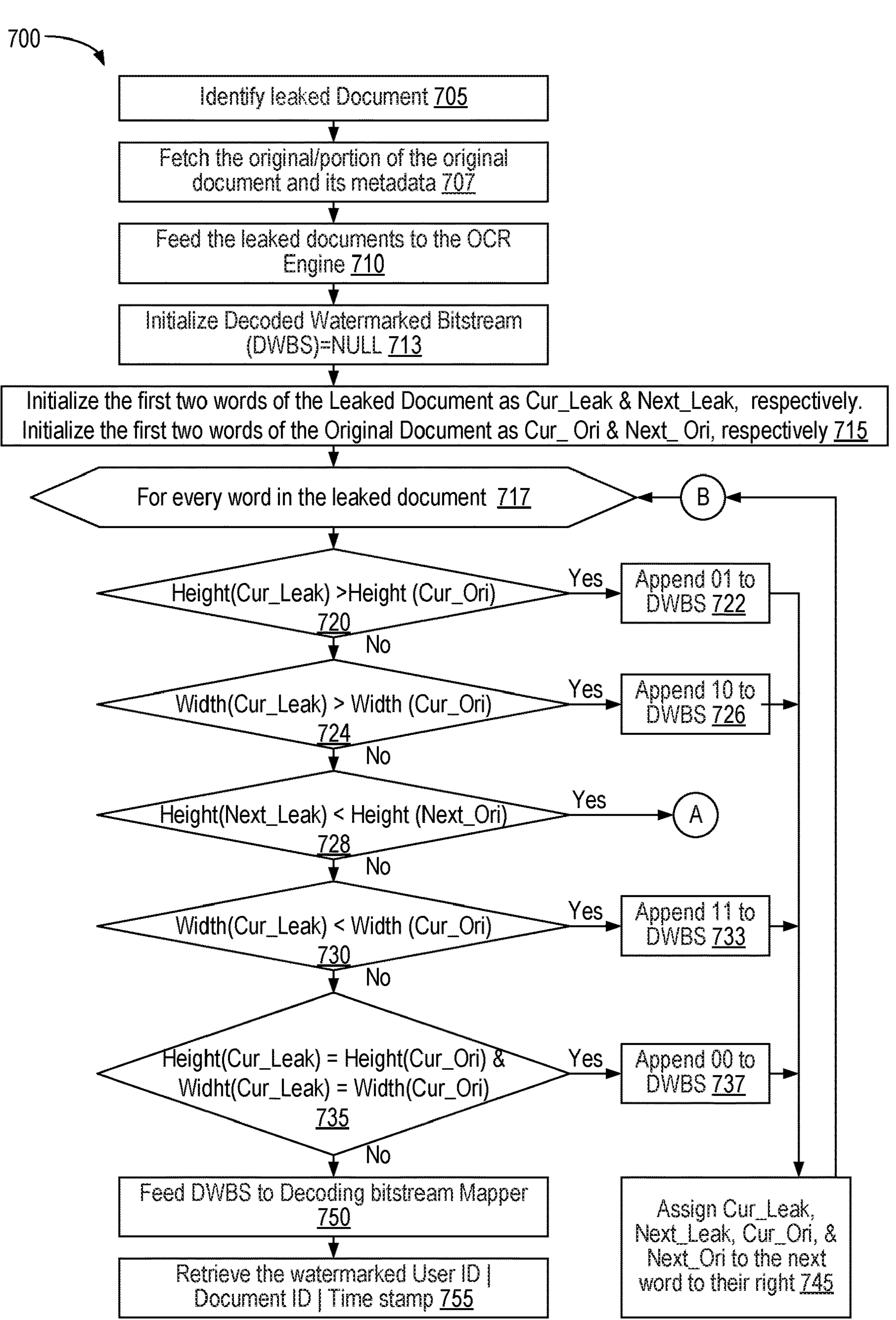
FIG. 7A depicts a process 700 by which a unique ID is decoded from a leaked document (705).

FIG. 7A depicts a process 700 by which a unique ID is decoded from a leaked document (705) with a bitstream encoded using 2(a) of Table 6. The original document's metadata is fetched from file storage (707) to serve as a reference. The leaked document is fed to the OCR engine to extract the renderable dimensions for each of the words (710). Since the same pre-coded bitstream is used repeatedly to watermark the entire document, the decoding process keeps track of the code delimiter to extract a single pre-coded bitstream. A variable DWBS, for "Decoded Watermarked Bitstream," is initialized to null, or zero, (713) in preparation for receiving an extracted bitstream. The first two words of the leaked document are initialized as Cur_Leak and Next_Leak, while the corresponding words from the original document are initialized as Cur_Ori and Next_Ori (715). Then, the height and width of each word in the leaked document are compared with the height and width of the corresponding word in the original document (for-loop 717). If the height of the current leaked word is greater than that of the original, bit pair 01 is appended to variable DWBS (720, 722); if the width of the current leaked word is greater than that of the original, bit pair 10 is appended to variable DWBS (724, 726); if the height of the next leaked word is less than that of the original (728), indicative of a code delimiter, the process moves to FIG. 7B at node A (discussed below); if the width of the next leaked word is less than that of the original, bit pair 11 is appended to variable DWBS (730, 733); and if both the height and width of the current leaked word equal those of the respective original words, bit pair 00 is appended to variable DWBS (735, 737). Each match of 722, 726, 733, and 737 is followed by reassigning the current and next leaked and original word variable to the next available pair (745) and returning to the start of for-loop 717. If none of decisions 720, 724, 728, 730, and 735 yields a match, then the fully constructed DWBS is fed to a decoding bitstream mapper (750) to recover the unique ID from the leaked document, which is in turn used to retrieve the User ID, Document ID, and Time stamp (755).

Figure 7B:
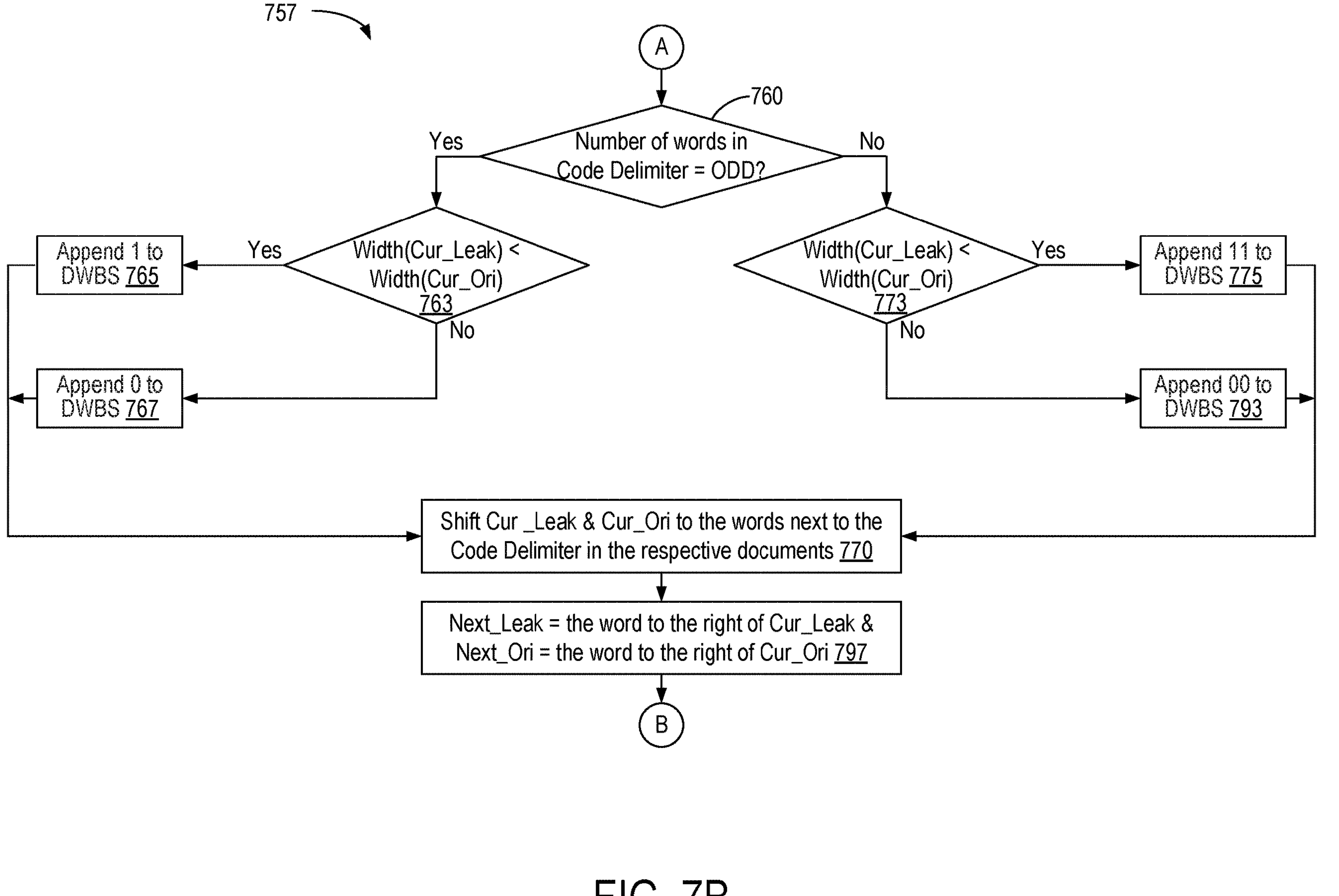
FIG. 7B depicts a process 757 that extends process 700 of FIG. 7A to append one or two binary bits to a watermark decoded from a leaked document.

Returning to decision 728, when the next word in the leaked document identifies a code delimiter, the decoding process checks for the number of code-delimiter word by branching from node A to the process of FIG. 7B, a process labeled 757. Per decisions 760 and 763, if the number of words in the code delimiter is odd and the width of the current word in the leaked document is less than that of the original document, then the process appends a binary one to the DWBS (765), and otherwise appends a zero (767). Returning to decision 760, if the number of words in the code delimiter is not odd (i.e. is even) and the width of the current word in the leaked document is less than that of the original document (decision 773), then the process appends a binary 11 to the DWBS (775), and otherwise appends a binary 00 (793).

Whatever one- or two-bit values is appended to the decoded watermarked bitstream DWBS, the word pairs from the leaked and original document are then shifted two words to the right (770). Variables Next_Leak and Next_Ori are then assigned to the word to the right of the new value for Cur_Leak and Cur_Ori, respectively (797). The process then returns to FIG. 7A via node B.

Every time the bits are extracted from each of the words in the leaked document, they are appended to the DWBS until the code delimiter is reached. The bitstream in the DWBS is fed to the Decoding Bitstream Mapper to identify the unique ID of the actual leaker. The User ID is then extracted from the unique ID. The user corresponding to this User ID is identified to be the malicious one who has leaked the document.

In an alternative embodiment, every word of the document is processed as per the mapping done in a two bit/word watermarking process. Once the code delimiter is encountered, the count on the number of words used as code delimiter is calculated and the decoding scheme goes back by one word and adjusts the decoding (odd/even) as per the requirement.

Blind Detection

Watermarked documents can be analyzed absent of the original document. Typographical variations encoding watermarks can be decoded with reference to properties of the leaked document. For example, an OCR engine can identify variations in word height or spacing. Relatively high words can be logic one, average heights a logic zero, and lower heights code delimiters. Measured heights can be limited to specific letters or types of letters, such as to "x-height" letters, which exclude capital letters and lowercase ascenders (like "t" and "b") and descenders (like "p" and "j"). Words that lack x-height letters, like "by" and "fit", can be excluded from encoding. Decoding schemes like those noted above can be used. For example, leaked documents can be decoded in the blind using any of the following numbered clauses: Clause 8. A method of for blind detection amidst code reuse with varied types of encoding, the method comprising: scanning the watermarked document to calculate the normalized dimensions of the rendering elements; and identifying the encoded user identifier even in the absence of the original document for comparison. Clause 8(a). A method of clause 8, wherein the rendering dimensions of the watermarked document is tracked for the code delimiter. 8(b). A method of clause 8(a), wherein the type of encoding corresponding to the code delimiter is identified from a mapping table. Clause 8(c). A method of clause 8(b), wherein the decoding scheme relevant to the identified encoding is invoked to extract the encoded user identifier. Clause 8(d). A method of clause 8, wherein the length (odd/even) of the user identifier encoded in the document is extracted from the number of elements used to represent the code delimiter. Clause 8(e). A method of clause 8(c), wherein the error correction codes are used to correct the errors in the extracted user identifier if any.

Error Correction Codes to Handle Document Distortion and OCR Limitations

OCR limitations and document distortion limit the ability of leak-detection systems to recover information encoded as digital watermarks. Repeated encodings of a unique identifier provide helpful redundancy. Cropped or otherwise partial documents may lack redundancy and may thus be more difficult to decode. Some embodiments address these concerns with error correction. A unique identifier can be pre-coded with error-correction bits prior to watermarking. Reed-Solomon encoding is used in some embodiments, though other schemes can also be used.

Support for Dense Watermarking

The methods described herein are extendable to encoding of more than two bits per word. With higher resolution in OCR technology more levels (e.g. +/−0.25%, 0.5%, 0.75%, 1%) in the dimensions of word size are possible to introduce and detect, so more bits may be represented in each word, making the watermarking denser.

Leaked documents may require some processing before analysis. For example, a photo of a leaked document or a portion of a leaked document may be too distorted to recover an encoded unique ID. Leaked documents can be analyzed for irregularities that deviate from corresponding features in the original document. For example, corners, edges, and lines of text can be detected in both leaked and original documents. The leaked document can then be adjusted to match the original. Similar adjustments can be made to e.g. document color and shading.

Document adjustments can be manual. Using photo editing software, for example, one can manually adjust a leaked document to align with and otherwise match the original. Overlaying the leaked and original documents can help in accurately aligning and correcting any distortions by ensuring that the lines and words match. If a leaked photo was taken at an angle, perspective distortion can be corrected using tools that adjust the perspective, aligning it with the actual document's perspective. Software tools are available for removing distortion and may use camera metadata that identifies the lens used to capture the image of the leaked document. Some advanced software tools can automatically correct distortions using algorithms that compare a distorted image with a reference image. Dimensions, areas, and aspect ratios can also be scaled for comparison to an original document.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method of decoding an encoded identifier from a scanned document using at least one processor. The computer-implemented method of decoding also includes recognizing text elements in the scanned document using the at least one processor executing a character-recognition process. The decoding also includes measuring at least one areal property of the text elements. The decoding also includes extracting the identifier from the measured areal property of the text elements. The decoding also includes extracting a delimiter from the measured areal property of the text elements, the delimiter marking an end of the encoded identifier. Other embodiments of this aspect include corresponding computer systems, apparatus, and computer programs recorded on one or more computer storage devices, each configured to perform the actions of the methods.

Implementations may include one or more of the following features. The computer-implemented method may include decoding the delimiter to select a decoding scheme for the identifier and decoding the identifier using the decoding scheme. The computer-implemented method may include extracting a second delimiter, shorter than the first-mentioned delimiter, from the measured areal property of the text elements, the second delimiter marking a second end of the encoded identifier. Extracting the identifier may include correlating a first bit pattern to text-element height and a second bit pattern to text-element width. Extracting the identifier may include comparing the measured areal property with a reference areal property of an original document. The computer-implemented method may include correlating a third bit pattern to a property of the text elements that is unchanged relative to an original document. Implementations of the described techniques may include hardware, a method or process, or computer software on a computer-accessible medium.

One general aspect includes a computer-implemented method of decoding an encoded identifier from a scanned document using at least one processor. The computer-implemented method of decoding also includes recognizing text elements in the scanned document using the at least one processor executing a character-recognition process. The decoding also includes measuring at least one typographical property of the text elements. The decoding also includes extracting the identifier from the measured typographical properties of the text elements. The decoding also includes extracting a delimiter from the measured typographical properties of the text elements, the delimiter marking an end of the encoded identifier. Other embodiments of this aspect include corresponding computer systems, apparatus, and computer programs recorded on one or more computer storage devices, each configured to perform the actions of the methods.

Implementations may include one or more of the following features. The computer-implemented method may include decoding the delimiter to select a decoding scheme for the identifier and decoding the identifier using the decoding scheme. The computer-implemented method may include extracting a second delimiter, shorter than the first-mentioned delimiter, from the measured typographical properties of the text elements, the second delimiter marking a second end of the encoded identifier. Extracting the identifier may include correlating a first bit pattern to text-element height and a second bit pattern to text-element width. Extracting the identifier may include comparing the measured typographical properties with reference typographical properties of an original document. The computer-implemented method may include correlating a third bit pattern to one of the typographical properties of the text elements that are unchanged relative to corresponding text elements in the original document. Implementations of the described techniques may include hardware, a method or process, or computer software on a computer-accessible medium.

One general aspect includes a computer-implemented method for encoding an identifier in a digital document. The computer-implemented method also includes formatting a first text element of the digital document responsive to a first multi-bit pattern from the identifier to encode the first multi-bit pattern as a first renderable typographical property of the first text element. The method also includes formatting a second text element of the digital document responsive to a second multi-bit pattern from the identifier to encode the second multi-bit pattern as a second renderable typographical property of the second text element. The method also includes formatting a third text element of the digital document responsive to a third multi-bit pattern from the identifier to encode the third multi-bit pattern as a third renderable typographical property of the third text element. Other embodiments of this aspect include corresponding computer systems, apparatus, and computer programs recorded on one or more computer storage devices, each configured to perform the actions of the methods.

Implementations may include one or more of the following features. The computer-implemented method may include, with the one or more processors, correlating a fourth text element with a fourth multi-bit pattern from the identifier and foregoing formatting of the fourth text element responsive to the fourth multi-bit pattern. Each of the first, second, third, and fourth multi-bit patterns is two bits. The first renderable typographical property is width and the second renderable typographical property is height. The text elements may include words, the computer-implemented method may include, for each of the words and with the one or more processors: delineating a bounding box around the word, the bounding box encompassing an area that includes the word and background; scaling the area; and replacing or covering the word with the scaled area. The background includes a margin around the text elements, the margin sufficient to cover the word when the area is scaled. The computer-implemented method may include recognizing the text elements. The computer-implemented method may include associating the identifier with a user and the digital document. The identifier has a number of bits, the computer-implemented method may include deriving a code delimiter from the number of bits and formatting at least one fourth text element to encode the code delimiter. The computer-implemented method may include deriving a second delimiter, shorter than the code delimiter, and formatting a least one fifth text element to encode the second delimiter. The identifier combines a user identifier and a document identifier. Implementations of the described techniques may include hardware, a method or process, or computer software on a computer-accessible medium.

One general aspect includes a method of encoding an identifier into text elements of a digital document. The method also includes selecting an encoding scheme having an encoding-scheme reference. The method also includes encoding the identifier into first typographical properties of a first set of the text elements using the encoding scheme. The method also includes encoding the encoding-scheme reference into second typographical properties of a second set of the text elements.

The method where encoding the identifier into the first typographical properties of the first set of text elements may include selecting different typographical properties for a first subset of the first set of the text elements than for a second subset of the first set of the text elements. The typographical properties include text height, and the text height of the first subset differs from the text height of the second subset. The text height of the second set of text elements differs from the text height of the first and second subsets of the first set of text elements. Encoding the identifier changes the text height of only one of the first and second subsets of the first set of text elements.

One general aspect includes a computer-implemented. The computer-implemented method also includes recognizing text elements in a scanned document using at least one processor executing a character-recognition process. The method also includes extracting a first bitstream from first ones of the text elements, the first bitstream including a pre-coded sequence identifying a decoding scheme. The method also includes extracting a second bitstream from second ones of the text elements. The method also includes decoding the second bitstream using the decoding scheme. The method also includes identifying a user from at least one of the first bitstream and the decoded second bitstream.

The computer-implemented method where the first bitstream is assigned to the user and a second user. The computer-implemented method may include the user to the decoding scheme and the second user to a second decoding scheme. The first bitstream may include a code delimiter for the second bitstream. The first bitstream encodes a parameter of the second bitstream. The parameter indicates whether the second bitstream includes an odd or an even number of bits. The first ones of the text elements delimit the second ones of the text elements in the scanned document. The first bitstream is of a bit length that identifies the decoding scheme. The decoding scheme for the second bitstream is encoded in spaces between the first ones of the text elements. The decoding scheme for the second bitstream is encoded in the spaces and a number of the first ones of the text elements.

One general aspect includes a computer-implemented method of extracting an identifier encoded into a scanned document using an encoding scheme. The computer-implemented method of extracting also includes recognizing first text elements in the scanned document using at least one processor, each of the first text elements having respective typographical properties, where the typographical properties of the first text elements differ among the first text elements to form a first encoded pattern. The extracting also includes detecting, with the at least one processor, at least one second text element in the scanned document, the second text element having the typographical properties that differ from the typographical properties of the first text elements and form a second encoded pattern. The extracting also includes decoding, with the at least one processor, the second encoded pattern to select an inverse of the encoding scheme. The extracting also includes decoding, with the at least one processor, the first encoded pattern using the inverse of the encoding scheme to extract the identifier.

The method where the typographical properties of the first text elements are encoded with height variations among the first text elements. The typographical properties of the at least one second text element are encoded with height variations of the at least one second text element relative to the heights of the first text elements. The first average height differs from the second average height. The first average height is greater than the second average height.

One general aspect includes a computer-implemented method of decoding an encoded identifier from a scanned document. The computer-implemented method of decoding also includes measuring, with the one or more processors, at least one typographical property of text elements in the scanned document. The decoding also includes extracting, with the one or more processors, the identifier from the at least one measured typographical property of the text elements. The decoding also includes extracting, with the one or more processors, a delimiter from the at least one measured typographical property of the text elements, the delimiter marking an end of the encoded identifier.

The computer-implemented method may include extracting a second delimiter, shorter than the first-mentioned delimiter, from the at least one measured typographical property of the text elements, the second delimiter marking a second end of the encoded identifier. The computer-implemented method may include decoding the delimiter to select a decoding scheme for the identifier and decoding the identifier using the decoding scheme. Extracting the identifier may include correlating a first bit pattern to text-element height and a second bit pattern to text-element width. Extracting the identifier may include comparing the at least one measured typographical property with at least one reference typographical property of an original document. The computer-implemented method may include correlating a third bit pattern to one of the at least one typographical property of the text elements that are unchanged relative to corresponding text elements in the original document.

One general aspect includes a computer-implemented method of decoding an encoded identifier from a scanned document using at least one processor. The computer-implemented method of decoding also includes recognizing text elements in the scanned document using the at least one processor executing a character-recognition process. The decoding also includes extracting a code delimiter and the encoded identifier from the text elements, the code delimiter marking an end of the encoded identifier. The decoding also includes decoding the code delimiter to extract a parameter of the identifier. The decoding also includes decoding the extracted, encoded identifier in view of the parameter.

The computer-implemented method where the parameter of the identifier relates to a number of bits of the identifier. The parameter indicates whether the number of bits is odd or even. The parameter identifies a scheme for decoding the encoded identifier.

One general aspect includes a computer-implemented method of decoding an encoded identifier from a scanned document using at least one processor. The computer-implemented method of decoding also includes recognizing text elements in the scanned document using the at least one processor executing a character-recognition process. The decoding also includes extracting the identifier from the recognized text elements. The decoding also includes extracting a first delimiter and a second delimiter from the recognized text elements, each of the first and second delimiters marking an end of the encoded identifier.

The computer-implemented method may include decoding at least one of the first delimiter and the second delimiter to select a decoding scheme for the identifier. The computer-implemented method may include decoding the identifier using the decoding scheme. Decoding the identifier may include extracting multiple bits of the identifier from individual ones of the text elements. The text elements may include words. Extracting the multiple bits from individual words may include measuring areal properties of the words. The computer-implemented method may include comparing the areal properties of the words with the areal properties of reference words from a reference document. The areal properties may include word height and world width. The first delimiter is longer than the second delimiter.

One general aspect includes a computer-implemented method of encoding an identifier into a document using at least one processor. The computer-implemented method also includes formatting first text elements in the document responsive to the identifier to provide encoded text elements. The method also includes formatting second text elements in the document to provide a first delimiter of a first text-element length marking a first limit of the encoded text elements. The method also includes formatting third text elements in the document to provide a second delimiter of a second text-element length shorter than the first text-element length marking a second limit of the encoded text elements.

The computer-implemented method may include encoding a reference to a decoding scheme for decoding the identifier from the first text elements in the second text elements. The computer-implemented method may include repeatedly formatting additional sets of text elements in the document to encode the identifier and the reference. Encoding the identifier may include encoding multiple bits of the identifier into individual ones of the text elements. The text elements may include words. Encoding multiple bits into an individual word may include changing at most one of multiple areal properties of the word. The computer-implemented method may include storing reference areal properties of each encoded word as a reference word in reference document. The areal properties may include word height and world width.

Figure 8:
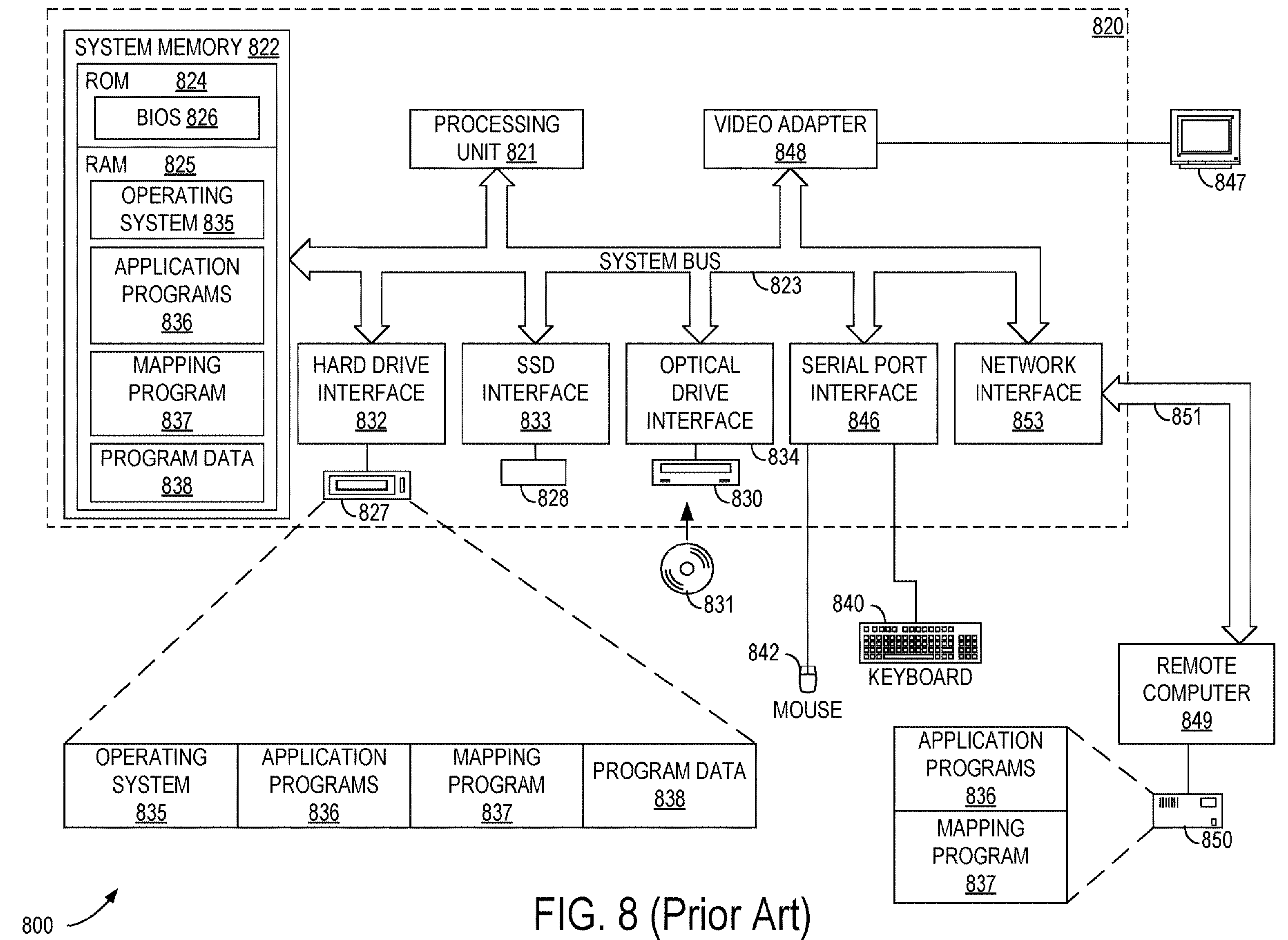
FIG. 8 (prior art) depicts a general-purpose computing system 800 that can serve as a client or a server depending on the program modules and components included.

FIG. 8 (prior art) depicts a general-purpose computing system 800 that can serve as a client or a server depending on the program modules and components included. One or more computers of the type depicted in computing system 800 can be configured to perform operations described with respect to FIGS. 1-7B. In such a configuration, a non-transitory computer-readable medium, such as a solid-state drive, is loaded with program instructions that can be executed by a processor or processors within one or more computing systems to perform the above-described methods. Those skilled in the art will appreciate that the invention may be practiced using other system configurations, including hand-held devices, multiprocessor systems, microprocessor-based or programmable consumer electronics, network PCs, minicomputers, mainframe computers, and the like.

Computing system 800 includes a conventional computer 820, including a processing unit 821, a system memory 822, and a system bus 823 that couples various system components including the system memory to the processing unit 821. The system bus 823 may be any of several types of bus structures, including a memory bus or memory controller, a peripheral bus, and a local bus using any of a variety of bus architectures. The system memory includes read only memory (ROM) 824 and random-access memory (RAM) 825. A basic input/output system 826 (BIOS), containing the basic routines that help to transfer information between elements within the computer 820, such as during start-up, is stored in ROM 824. The computer 820 further includes a hard disk drive 827 for reading from and writing to a hard disk, not shown, a solid-state drive 828 (e.g. NAND flash memory), and an optical disk drive 830 for reading from or writing to an optical disk 831 (e.g., a CD or DVD). The hard disk drive 827 and optical disk drive 830 are connected to the system bus 823 by a hard disk drive interface 832 and an optical drive interface 834, respectively. The drives and their associated computer-readable media provide nonvolatile storage of computer readable instructions, data structures, program modules and other data for computer 820. Other types of computer-readable media can be used.

Program modules may be stored on the hard disk, solid state disk 828, optical disk 831, ROM 824 or RAM 825, including an operating system 835, one or more application programs 836, other program modules 837, and program data 838. An application program 836 can use other elements that reside in system memory 822 to perform the processes detailed above in connection with the other figures. Computer-implemented methods of the type disclosed herein can be performed by a processor as a sequence of steps directed by instructions stored in a memory, or the steps can be divided across multiple processing units executed instructions stored across multiple memories.

A user may enter commands and information into the computer 820 through input devices such as a keyboard 840 and pointing device 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port, universal serial bus (USB), or various wireless options. A monitor 847 or other type of display device is also connected to the system bus 823 via an interface, such as a video adapter 848. In addition to the monitor, computers can include or be connected to other peripheral devices (not shown), such as speakers and printers.

The term "processor," as used herein, is not limited to the Central Processing Unit (CPU), the primary component of a computer or computer system responsible for executing the instructions of a computer program by performing the basic arithmetic, logic, controlling, and input/output (I/O) operations specified by the instructions. Rather, a "processor" can be any processing unit, including the CPU but also graphics processing units, signal-processing units, etc. The forgoing computer-implemented methods can be distributed across processors within and among networked computers and computer systems.

The computer 820 may operate in a networked environment using logical connections to one or more remote computers, such as a remote computer 849. The remote computer 849 may be another computer, a server, a router, a network PC, a peer device, or other common network node, and typically includes many or all the elements described above relative to the computer 820, although only a memory storage device 850 has been illustrated in FIG. 8 to show support for e.g. the databases noted above in connection with FIGS. 1-6. The logical connections depicted in FIG. 8 include a network connection 851, which can support a local area network (LAN) and/or a wide area network (WAN). Such networking environments are commonplace in offices, enterprise-wide computer networks, intranets, and the Internet.

Computer 820 includes a network interface 853 to communicate with remote computer 849 via network connection 851. In a networked environment, program modules depicted relative to the computer 820, or portions thereof, may be stored in the remote memory storage device. It will be appreciated that the network connections shown are exemplary and other means of establishing a communication link between the computers may be used.

In the foregoing description and in the accompanying drawings, specific terminology and drawing symbols are set forth to provide a thorough understanding of the present invention. In some instances, the terminology and symbols may imply specific details that are not required to practice the invention. Variations of these embodiments, including embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. section 112(f).

What is claimed is:

1. A method for encoding an identifier in a digital document, the method comprising:

formatting a first text element of the digital document responsive to a first multi-bit pattern from the identifier to encode the first multi-bit pattern as a first areal perturbation of the first text element by adjusting at least one of a height and a width of the first text element in accordance with the first multi-bit pattern;

formatting a second text element of the digital document responsive to a second multi-bit pattern from the identifier to encode the second multi-bit pattern as a second areal perturbation of the second text element by adjusting at least one of a height and a width of the second text element in accordance with the second multi-bit pattern; and formatting a third text element of the digital document responsive to a third multi-bit pattern from the identifier to encode the third multi-bit pattern as a third areal perturbation of the third text element by adjusting at least one of a height and a width of the third text element in accordance with the third multi-bit pattern.

2. The method of claim 1, further comprising correlating a fourth text element with a fourth multi-bit pattern from the identifier and foregoing formatting of the fourth text element responsive to the fourth multi-bit pattern.

3. The method of claim 2, wherein each of the first, second, third, and fourth multi-bit patterns is two bits.

4. The method of claim 1, wherein the first areal perturbation is a change in width and the second areal perturbation is a change in height.

5. The method of claim 1, wherein the text elements comprise words, the method further comprising, for each of the words:

delineating a bounding box around the word, the bounding box encompassing an area that includes the word and background;

scaling the area; and replacing or covering the word with the scaled area.

6. The method of claim 5, wherein the background includes a margin around the text elements, the margin sufficient to cover the word when the area is scaled.

7. The method of claim 5, further comprising recognizing the text elements.

8. The method of claim 1, wherein the identifier has a number of bits, the method further comprising deriving a code delimiter from the number of bits and formatting at least one fourth text element to encode the code delimiter.

9. The method of claim 1, wherein the identifier combines a user identifier and a document identifier.

10. The method of claim 1, wherein at least two bits of the identifier are encoded in a single change to a renderable dimension of a corresponding text element.

11. The method of claim 10, wherein the single change comprises a dimensional variation of the corresponding text element selected from an increase in height, a decrease in height, an increase in width, and a decrease in width.

12. The method of claim 1, wherein more than two bits of the identifier are encoded in a fewer number of dimensional changes than the number of bits being encoded, such that the number of dimensional changes to the text elements is fewer than the number of bits encoded.

13. A computer-implemented method of extracting an identifier encoded into a scanned document using an encoding scheme that encodes patterns in areal properties of text elements, the areal properties including at least one of width and height, the method comprising:

recognizing first text elements in the scanned document using at least one processor, each of the first text elements having respective first areal properties, wherein the areal properties of the first text elements differ among the first text elements to form a first encoded pattern;

detecting, with the at least one processor, at least one second text element in the scanned document, the second text element having second areal properties that differ from the first areal properties of the first text elements and form a second encoded pattern;

decoding, with the at least one processor, the second encoded pattern to select an inverse of the encoding scheme; and decoding, with the at least one processor, the first encoded pattern using the inverse of the encoding scheme to extract the identifier.

14. The method of claim 13, wherein the first areal properties of the first text elements are encoded with variations in the height among the first text elements.

15. The method of claim 14, wherein the second areal properties are encoded with variations in the height of the at least one second text element relative to the heights of the first text elements.

16. The method of claim 15, the first and second text elements having respective first and second average heights, and wherein the first average height differs from the second average height.

17. A method for encoding an identifier in a digital document, the method comprising:

formatting a first text element of the digital document responsive to a first multi-bit pattern from the identifier to encode the first multi-bit pattern by perturbing a first typographical property of the first text element;

formatting a second text element of the digital document responsive to a second multi-bit pattern from the identifier to encode the second multi-bit pattern by perturbing a second typographical property of the second text element; and formatting a third text element of the digital document responsive to a third multi-bit pattern from the identifier to encode the third multi-bit pattern by perturbing a third typographical property of the third text element.

18. The method of claim 17, further comprising correlating a fourth text element with a fourth multi-bit pattern from the identifier and foregoing formatting of the fourth text element responsive to the fourth multi-bit pattern.

19. The method of claim 18, wherein each of the first, second, third, and fourth multi-bit patterns is two bits.

20. The method of claim 17, wherein the first typographical property is width and the second typographical property is height.

21. The method of claim 17, wherein the text elements comprise words, the method further comprising, for each of the words:

delineating a bounding box around the word, the bounding box encompassing an area that includes the word and background;

scaling the area; and replacing or covering the word with the scaled area.

22. The method of claim 21, wherein the background includes a margin around the text elements, the margin sufficient to cover the word when the area is scaled.

23. The method of claim 17, wherein the identifier has a number of bits, the method further comprising deriving a code delimiter from the number of bits and formatting at least one fourth text element to encode the code delimiter.

24. The method of claim 17, wherein at least two bits of the identifier are encoded in a single change to a typographical property of a corresponding text element, thereby reducing a total number of property changes relative to the number of bits encoded.

* * * * *